(12) United States Patent
Nakano et al.

(10) Patent No.: US 11,317,316 B2
(45) Date of Patent: Apr. 26, 2022

(54) COMMUNICATION APPARATUS, SYSTEM, METHOD, ALLOCATION APPARATUS, AND NON-TRANSITORY RECORDING MEDIUM

(71) Applicant: NEC CORPORATION, Tokyo (JP)

(72) Inventors: Shintaro Nakano, Tokyo (JP); Hideo Hasegawa, Tokyo (JP); Satoru Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/836,234

(22) Filed: Mar. 31, 2020

(65) Prior Publication Data
US 2020/0229025 A1 Jul. 16, 2020

Related U.S. Application Data

(63) Continuation of application No. 15/557,650, filed as application No. PCT/JP2016/057522 on Mar. 10, 2016, now Pat. No. 10,638,354.

(30) Foreign Application Priority Data

Mar. 13, 2015 (JP) ................. 2015-051225

(51) Int. Cl.
H04W 28/02 (2009.01)
H04L 12/24 (2006.01)
(Continued)

(52) U.S. Cl.
CPC ..... *H04W 28/0268* (2013.01); *H04L 41/0893* (2013.01); *H04L 41/5019* (2013.01);
(Continued)

(58) Field of Classification Search
CPC .............. H04W 28/0268; H04W 28/24; H04L 41/0893; H04L 41/5019; H04L 47/805; H04L 45/64
See application file for complete search history.

(56) References Cited

U.S. PATENT DOCUMENTS

2012/0014332 A1* 1/2012 Smith ................... H04M 15/60
370/329
2015/0124622 A1* 5/2015 Kovvali .............. H04L 67/1006
370/236
(Continued)

FOREIGN PATENT DOCUMENTS

JP 2014090501 A 5/2014
WO 2014/208538 A1 12/2014

OTHER PUBLICATIONS

"Network Functions Virtualisation (NFV); Architectural Framework", ETSI GS NFV 002 V1.1.1, Oct. 2013, pp. 1-21.
(Continued)

*Primary Examiner* — Robert C Scheibel
(74) *Attorney, Agent, or Firm* — Sughrue Mion, PLLC

(57) ABSTRACT

Traffic is allocated to a dedicated apparatus that performs a predetermined network function or a predetermined virtual network function corresponding to the predetermined network function of the dedicated apparatus, according to a service level set in correspondence with information relating to the traffic, and the traffic is forwarded to the dedicated apparatus or the predetermined virtual network function, based on a result of the allocation.

14 Claims, 20 Drawing Sheets

(51) Int. Cl.
H04W 28/24 (2009.01)
H04L 12/715 (2013.01)
H04L 12/927 (2013.01)
H04L 12/801 (2013.01)
H04L 41/0893 (2022.01)
H04L 41/5019 (2022.01)
H04L 45/64 (2022.01)
H04L 47/80 (2022.01)
H04L 41/5003 (2022.01)

(52) U.S. Cl.
CPC .......... *H04L 45/64* (2013.01); *H04L 47/805* (2013.01); *H04W 28/24* (2013.01); *H04L 41/5003* (2013.01); *H04L 47/14* (2013.01)

(56) References Cited

U.S. PATENT DOCUMENTS

| | | | |
|---|---|---|---|
| 2015/0382242 A1* | 12/2015 | Sunavala | H04W 24/02 370/254 |
| 2016/0072823 A1* | 3/2016 | Faccin | H04W 88/06 726/1 |
| 2016/0142474 A1 | 5/2016 | Itsumi et al. | |
| 2017/0111878 A1* | 4/2017 | Wang | H04W 60/00 |
| 2017/0332278 A1* | 11/2017 | Fujinami | H04W 36/22 |

OTHER PUBLICATIONS

"Network Functions Virtualisation (NFV); Management and Orchestration", ETSI GS NFV-MAN 001 V1.1.1, Dec. 2014, pp. 1-184.
3GPP TS 23.401 V9.5.0, 3rd Generation Partnership Project; Technical Specification Group Services and System Aspects; General Packet Radio Service (GPRS) enhancements for Evolved Universal Terrestrial Radio Access Network (E-UTRAN) access (release 9), Jun. 2010, pp. 1-259.
A. Nakao et al., "Application and Device Specific Slicing for MVNO", 2014 International Science and Technology Conference, IEEE, Oct. 2014, total 5 pages.
Communication dated May 8, 2018, from Japanese Patent Office in counterpart application No. 2017-506490.
Decision to Grant a Patent dated Jun. 18, 2019 from the Japanese Patent Office in application No. 2018-151063.
Hideyuki Shimonishi, "Recent Activities on Network Functions Virtualization (NFV)", The Journal of the Institute of Electronics, Information and Communication Engineers, The Institute of Electronics, Information and Communication Engineers, Mar. 1, 2015, pp. 225-231.
International Search Report for PCT/JP2016/057522 dated May 10, 2016 [PCT/ISA/210].
Jose Costa-Requena, "SDN integration in LTE mobile backhaul networks", The International Conference on Information Networking 2014, Feb. 2014, pp. 264-269.
Koji Tsubouchi, et al., "NFV Management and Orchestration Technology to Automatically Build Network Services on Demand", The Institute of Electronics, Information and Communication Engineers, Sep. 4, 2014, pp. 107-112, vol. 114, No. 206.
Morioka, Chiharu,. et al., "A Study on Policy Control Functions in Service Chaining Architecture", The IEICE Technical Report, vol. 114, No. 477, Feb. 23, 2015, pp. 469-473 (8 pages).
Ahmed M. Medhat et al., "Multi-tenancy for Virtualized Network Functions", Proceedings of the 2015 1st IEEE Conference on Network Softwarization (NetSoft), IEEE, Apr. 13, 2015 (6 pages total).
Joyce Mwangama et al., "Towards Mobile Federated Network Operators", Proceedings of the 2015 1st IEEE Conference on Network Softwarization (NetSoft), IEEE, Apr. 13, 2015 (6 pages total).
Notice of Reasons for Refusal dated Jun. 23, 2020, from the Japanese Patent Office in Application No. 2019-131316.
Japanese Office Action for JP Application No. 2019-131316 dated Jan. 19, 2021 with English Translation.
Juniper Networks, Contrai I Cloud Solution corresponding to NFV—Mobility and Innovation of Turnkey Type Service by Introducing Open and Comprehensive NFV Technology and Ecosystem Realization, Solution Brief, Oct. 2014, pp. 1-6, URL, https://www.juniper.net/jp/jp/local/pdf/solutionbriefs/3510523-jp.pdf.
Misawa, Akira, et al. Proposal on virtual edge architecture and traffic flow control, IEICE Technical Report vol. 114 No. 6, Apr. 10, 2014, pp. 17-22, Japan.

* cited by examiner

| CARRIER | SERVICE LEVEL | ALLOCATION DESTINATION |
|---|---|---|
| A | 1 st | DEDICATED APPARATUS (Non-NFV) |
| B | 2 nd | VNF1B |
| C | 3 rd | VNF1C |

| TERMINAL IDENTIFICATION INFORMATION (ADDRESS) | ALLOCATION DESTINATION |
|---|---|
| A | DEDICATED APPARATUS |
| B | VNF1B |
| C | VNF1C |

| CARRIER | SERVICE LEVEL | ALLOCATION VNF |
|---|---|---|
| A | 1 st | VNF1A |
| B | 2 nd | VNF1B |
| C | 3 rd | VNF1C |

| USER TERMINAL ID (ADDRESS) | CARRIER | SERVICE LEVEL | ALLOCATION VNF |
|---|---|---|---|
| USER 1 | A | 1st | VNF1A |
| USER 2 | A | 2nd | VNF1B |
| USER 3 | B | 3rd | VNF1C |

| USER TERMINAL ID (ADDRESS) | CARRIER | SERVICE LEVEL | ALLOCATION VNF |
|---|---|---|---|
| USER 1 | A | 1 st | VNF1A |
| USER 2 | A | 2 nd | VNF1B |
| USER 3 | B | 3 rd | VNF1C |

| CARRIER | CONTENT | SERVICE LEVEL | ALLOCATION VNF |
|---|---|---|---|
| A | YouTube(HD) | $1^{st}$ | VNF1A |
| A | OTHER | $2^{nd}$ | VNF1B |
| A | YouTube(SD) | $3^{rd}$ | VNF1C |

| CARRIER | SERVICE LEVEL | ALLOCATION VNF |
|---------|---------------|----------------|
| A | 1 st | VNF1A |
| B | 2 nd | VNF1B |
| C | 3 rd | VNF1C |

| USER TERMINAL ID (ADDRESS) | CARRIER | SERVICE LEVEL | ALLOCATION VNF |
|---|---|---|---|
| USER 1 | A | $1^{st}$ | VNF1A |
| USER 2 | A | $2^{nd}$ | VNF1B |
| USER 3 | B | $3^{rd}$ | VNF1C |

| USER TERMINAL ID (ADDRESS) | CARRIER | SERVICE LEVEL | ALLOCATION VNF |
|---|---|---|---|
| USER 1 | A | 1st | VNF1A |
| USER 2 | A | 2nd | VNF1B |
| USER 3 | B | 3rd | VNF1C |

| CARRIER | CONTENT | SERVICE LEVEL | ALLOCATION VNF |
|---|---|---|---|
| A | YouTube(HD) | 1 st | VNF1A |
| A | OTHER | 2 nd | VNF1B |
| A | YouTube(SD) | 3 rd | VNF1C |

FIG. 17A

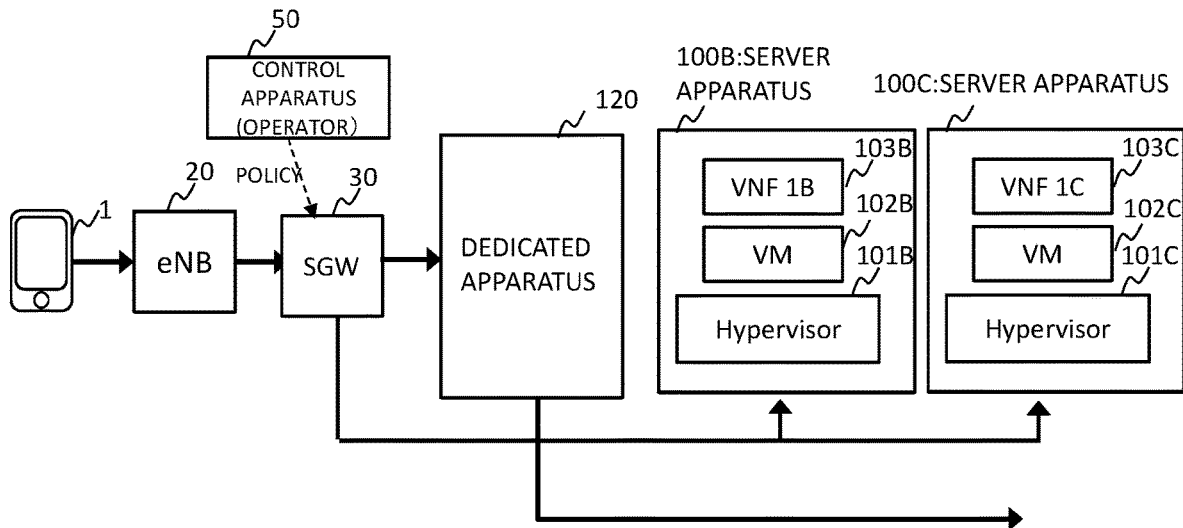

FIG. 17B

| CARRIER | SERVICE LEVEL | ALLOCATION DESTINATION |
|---|---|---|
| A | 1 st | DEDICATED APPARATUS (Non-NFV) |
| B | 2 nd | VNF1B |
| C | 3 rd | VNF1C |

FIG. 17C

| USER TERMINAL ID (ADDRESS) | CARRIER | SERVICE LEVEL | ALLOCATION DESTINATION |
|---|---|---|---|
| USER 1 | A | 1 st | DEDICATED APPARATUS (Non-NFV) |
| USER 2 | A | 2 nd | VNF1B |
| USER 3 | B | 3 rd | VNF1C |

FIG. 17D

| CARRIER | CONTENT | SERVICE LEVEL | ALLOCATION DESTINATION |
|---|---|---|---|
| A | YouTube(HD) | 1 st | DEDICATED APPARATUS (Non-NFV) |
| A | OTHER | 2 nd | VNF1B |
| A | YouTube(SD) | 3 rd | VNF1C |

FIG. 18A

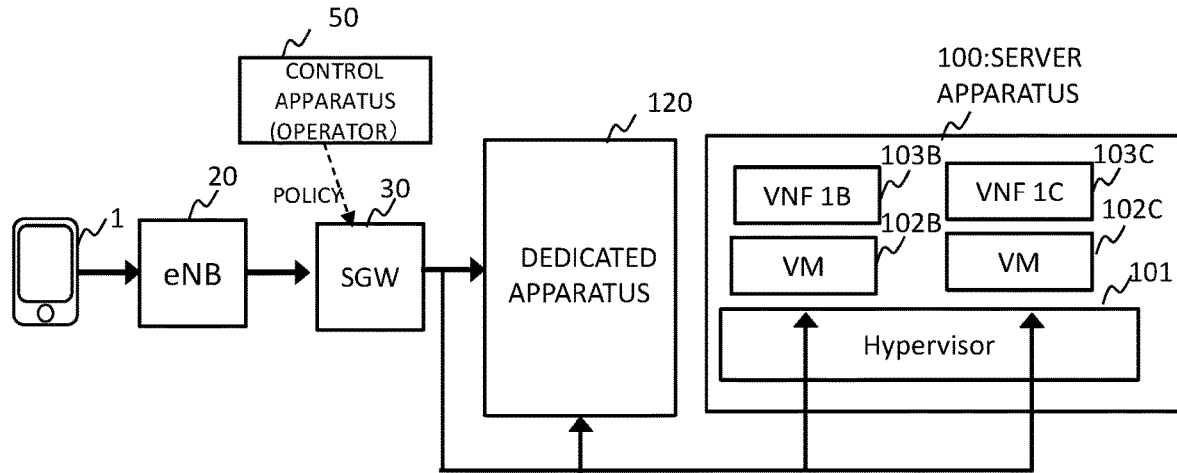

FIG. 18B

| CARRIER | SERVICE LEVEL | ALLOCATION DESTINATION |
|---|---|---|
| A | 1 st | DEDICATED APPARATUS (Non-NFV) |
| B | 2 nd | VNF1B |
| C | 3 rd | VNF1C |

FIG. 18C

| USER TERMINAL ID (ADDRESS) | CARRIER | SERVICE LEVEL | ALLOCATION DESTINATION |
|---|---|---|---|
| USER 1 | A | 1 st | DEDICATED APPARATUS (Non-NFV) |
| USER 2 | A | 2 nd | VNF1B |
| USER 3 | B | 3 rd | VNF1C |

FIG. 18D

| CARRIER | CONTENT | SERVICE LEVEL | ALLOCATION DESTINATION |
|---|---|---|---|
| A | YouTube(HD) | 1 st | DEDICATED APPARATUS (Non-NFV) |
| A | OTHER | 2 nd | VNF1B |
| A | YouTube(SD) | 3 rd | VNF1C |

COMMUNICATION APPARATUS, SYSTEM, METHOD, ALLOCATION APPARATUS, AND NON-TRANSITORY RECORDING MEDIUM

REFERENCE TO RELATED APPLICATION

This application is a Continuation of U.S. application Ser. No. 15/557,650, now U.S. Pat. No. 10,638,354, filed Sep. 12, 2017, which is a National Stage of International Application No. PCT/JP2016/057522, filed on Mar. 10, 2016, based upon and claims the benefit of the priority of Japanese patent application No. 2015-051225, filed on Mar. 13, 2015, the disclosures of which are incorporated herein in their entirety by reference thereto.

The present invention relates to a communication apparatus, a system, a method, an allocation apparatus, and a non-transitory recording medium. In particular, it relates to an apparatus, a system, a method, and a program suitably applied to mobile networks.

BACKGROUND

MVNO (Mobile Virtual Network Operator), which is a business form that provides mobile communication services, does not have its own radio communication infrastructures or the like, but leases necessary infrastructure such as radio communication infrastructure from MNO (Mobile Network Operator) and do mobile communication businesses under its own brand.

<L3 Connection>

In the case of an MVNO in Layer 3 (L3: network layer) connection, as schematically illustrated in FIG. 19A, a GTP (GPRS (General Packet Radio Service) Tunneling Protocol) session (Layer 2: L2) for forwarding an IP (Internet Protocol) packet from an end user is terminated within a network (core network) of an MNO. The MVNO in L3 connection only needs to prepare in an MVNO network 3 a router or the like that provides L3 communication services.

FIG. 19B schematically illustrates an example of a mode of the MVNO in L3 connection. FIG. 19B schematically illustrates a configuration example in which an EPC (Evolved Packet Core) accommodating an existing 2G/3G network and an LTE (Long Term Evolution) access network defined by 3GPP (3rd Generation Partnership Project) is configured as an MNO network 2 and the MVNO network 3 including a router such as an edge router and a server (not illustrated) is connected to the Internet 4. Here, individual nodes in EPC will be briefly described (reference may be made to for example, 3GPP TS 23.401 V9.5.0 (2010-06) for details of these nodes).

An MME (Mobility Management Entity) performs various kinds of processing such as mobility management and authentication of a terminal (mobile terminal) 1 (User Equipment: UE) and setting of a user data forwarding path. In addition, the MME performs user authentication or the like in cooperation with HSS (Home Subscriber Server) (retaining a subscriber profile). Furthermore, the MME is connected to an SGSN (Serving GPRS Support Node) that is connected to a (3rd Generation:3G) control station/base station (RNC (Radio Network Controller)/NodeB)) and performs position registration and so forth of a 3G terminal. MME sets and releases a user data forwarding path in an interval (S1-U) between an SGW (Serving Gateway) and a base station eNB (eNodeB).

An SGW exchanges user data with an eNB and sets and releases a communication path with a PGW (PDN (Packet Data Network) Gateway). The PGW is connected to a packet data network (PDN) such as an IMS (IP Multimedia Subsystem), the Internet, etc. and performs, for example, allocation of an IP (Internet Protocol) address (private IP address) to a terminal. A PCRF (Policy and Charging Rules Function) is a policy control apparatus that performs policy control based on a QoS (Quality of Service) or the like and determines a charging control rule(s). A PGW and an SGW perform policy control, for example, on a per packet basis, based on notification information (policies) from the PCRF. In FIG. 19B, a reference symbol such as S11, etc., given to a line between nodes represents an interface. In addition, a dashed line and a solid line represent a signal (data) of a control plane (C-Plane) and of a user plane (U-Plane), respectively.

In the case of L3 connection, MVNO does not directly perform operation of a PGW (or GGSN (Gateway GPRS Support Node) (not illustrated)), which is a packet relay apparatus on the MNO network 2. Allocation of an IP address to the terminal (mobile terminal) 1 is performed by a PGW of the MNO, for example. In L3 connection, communication control at the MVNO is performed in L3 (network layer). In addition, a packet forwarding amount, which is information necessary for charging and the like, is generally a daily or monthly forwarding amount provided by the MNO.

<L2 Connection>

In the case of an MVNO in Layer 2 (L2: data link layer) connection, as schematically illustrated in FIG. 20A, a GTP session from an end user is extended to the MVNO. The MVNO needs to arrange a packet relay apparatus in the MVNO network. A GTP tunnel in L2 is terminated at a PGW (or GGSN) provided in the MVNO network, for example.

FIG. 20B schematically illustrates an example of a mode of the MVNO in L2 connection. FIG. 20B schematically illustrates a configuration example in which an EPC is used as the MNO network 2 and the MVNO network 3 including an PGW is connected to the Internet 4.

The L2 connection is a connection mode in which the terminal 1 used by an end user is connected to the PGW of the MVNO via an L2 tunnel (GTP). Since the MVNO has the PGW, the MVNO can perform various kinds of control processing. In addition, various kinds of control servers may be arranged adjacent to the PGW on the MVNO network 3. Examples of these servers may include a RADIUS server (not illustrated) that performs, for example, management and authentication of users, an OCS (Online Charging System) (not illustrated) that manages data capacity and charging information about users, a PCRF (Policy and Charging Rules Function) that manages communication rules for each user, a PCEF (Policy and Enforcement Function) (not illustrated) that applies rules to the PGW and controls packet forwarding, and so forth. A packet relay apparatus such as the PGW and servers are technically more advanced and more expensive than an IP router, etc. Thus, in the MVNO of L2 connection, a cost required for operation, maintenance and so forth of the PGW, etc. becomes higher as compared with the L3 connection mode in which the MVNO only needs to prepare a router. However, the MVNO in L2 connection can perform band width control, etc. by using the PGW, etc. on the MVNO network 3.

CITATION LIST

Non-Patent Literature

NPL 1: ETSI GS NFV-MAN 001 V1.1.1 (2014-12) Network Functions Virtualisation (NFV); Management and Orchestration, searched on Jan. 25, 2015, Internet<http://www.etsi.org/deliver/etsi_gs/NFV-MAN/001_099/001/01.01.01_60/gs_NFV-MAN001v010101p.pdf>

SUMMARY

The following describes an analysis made by the present inventors.

As described above, an MVNO does not construct its own radio communication facilities, etc. Instead, the MVNO, by leasing radio communication facilities, etc., from a MNO which is a lending source thereof, provides a user with services at a low price. Thus, as seen from comparison between services provided by an MVNO and an MNO, it is often the case that the MVNO provides limited services. For example, a communication speed is slow;

a maximum use capacity per month is low; and provided no added function, such as voice communication, etc.

For example, when an MVNO is going to impose a limit on a user traffic or the like, under the present circumstances, a certain node such as a gateway in an MVNO network performs a traffic shaping (bandwidth control) or the like. For example, the traffic shaping is performed on an S1-U interface between an eNB and an SGW in an EPC, which is the MVNO network.

In principle, the MVNO uses resources and services (for example, bandwidth) provided by the MNO and pays for the resources and services that the MVNO has used. For example, in the case of the MVNO of L3 connection, generally, charging is determined by the connection bandwidth between the MVNO and the MNO (for example, the band width at a reference point SGi in FIG. 19B). The MVNO provides a service (for example, bandwidth) according to an amount (payment amount etc. of a customer) to the customer.

Thus, it is desirable that the service (for example, bandwidth) provided to a customer can be flexibly controlled.

However, a bandwidth control is generally performed based on a predicted traffic amount or the like. Thus, a flexible and accurate bandwidth control is difficult. For example, depending on the traffic amount, there is a possibility that a considerable amount of error would occur between a predicted value and an actual value.

In particular, an MVNO of L3 connection that does not have a packet forwarding apparatus such as a PGW cannot perform a real-time bandwidth control. Thus, there may be a case wherein a user traffic, which does not particularly need a high-function and high-performance apparatus, is allocated to a high-performance and high-performance apparatus. Conversely, there is another case wherein a user traffic, which needs a high-function and high-performance apparatus is allocated to a low-function and low-performance apparatus. Both of the above cases are far from effective use of resources and services.

Thus, the present invention has been made in view of the above problems, and it is an object of the present invention to provide an apparatus, a system, a method, and a non-transitory recording medium storing a program, each of which can realize appropriate allocation of resources for processing traffic to improve resource utilization efficiency.

According to an aspect of the present invention, there is provided an apparatus including: a first unit operable so as to allocate traffic to a dedicated apparatus that performs a predetermined network function or a predetermined virtual network function corresponding to the predetermined network function of the dedicated apparatus, according to a service level set in correspondence with information relating to the traffic; and a second unit operable so as to forward the traffic to the dedicated apparatus or the predetermined virtual network function based on a result of the allocation.

According to another aspect of the present invention, there is provided a method comprising:

allocating traffic to a dedicated apparatus that performs a predetermined network function or a predetermined virtual network function corresponding to the predetermined network function of the dedicated apparatus, according to a service level set in correspondence with information relating to the traffic; and forwarding the traffic to the dedicated apparatus or the predetermined virtual network function based on a result of the allocation.

According to still another aspect of the present invention, there is provided a non-transitory computer-readable recording medium storing therein a program causing a computer to perform processing comprising:

allocating traffic to a dedicated apparatus that performs a predetermined network function or a predetermined virtual network function corresponding to the predetermined network function of the dedicated apparatus, according to a service level set in correspondence with information relating to the traffic; and forwarding the traffic to the dedicated apparatus or the predetermined virtual network function based on a result of the allocation. The non-transitory computer-readable recording medium is such as a computer readable storage device in which the program is recorded.

According to still another aspect of the present invention, there is provided a server apparatus, including a plurality of virtual network functions with different processing performances, on a plurality of virtual machines, wherein the server apparatus selects, according to a service level relating to received traffic, one out of the plurality of virtual network functions to allocate the traffic to the selected virtual network function.

According to the present invention, resources for processing traffic can appropriately be allocated, and resource utilization efficiency can be improved. Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 17A to FIG. 17D are diagrams illustrating example embodiment 4 of the present invention.

FIG. 18A to FIG. 18D are diagrams illustrating example embodiment 5 of the present invention.

DETAILED DESCRIPTION

Figures 1A, 1B:
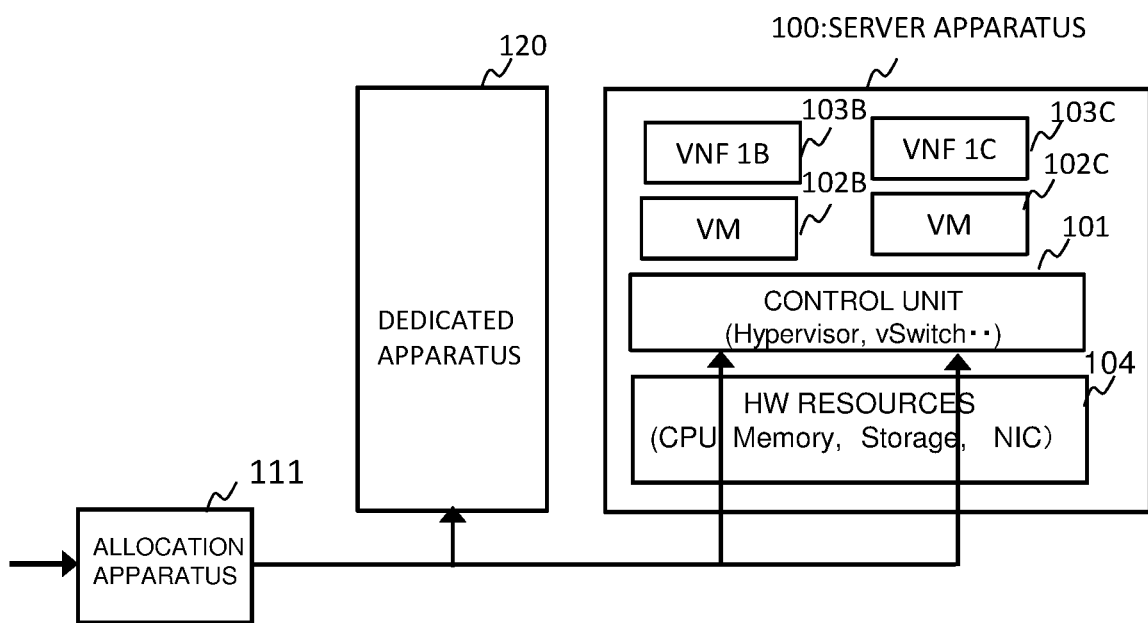
FIG. 1A and FIG. 1B are diagrams illustrating an example of a basic concept of the present invention.

The following describes example embodiments of the present invention.

According to one aspect of the present invention, a service is provided to a user of an MNO or MVNO carrier by using a virtual network function(s) (VNFs) each configured by virtualizing a part or all of a function of a network appliance, a node, and so forth on a server apparatus.

First, a technology of network function virtualization, which is a premise of the present invention, will be briefly described. In NFV (Network Functions Virtualization) which is a technology that virtualizes a network function, a network function is implemented, in terms of software, by an application (VNF) that runs on a virtual machine (VM) on a virtualization layer such as a hypervisor or a virtual machine monitor (VMM) of a server apparatus. For example, a function of a dedicated apparatus (a node of the EPC such as an MME, a PGW, or a SGW) can be implemented as a VNF that runs on a VM(s) on a virtualization layer. Hardware resources such as computing, storage, and networking, and a virtualization layer of a server apparatus constitute an NFVI (Network Functions Virtualization Infrastructure) serving as a VNF execution infrastructure. As management entities for controlling the NFVI and VNF, a VIM (Virtualized Infrastructure Manager) and a VNFM (Virtual Network Function Manager) are provided. In addition, as a node that manages a network service as a whole, an NFVO is included (for example, reference may be made to NPL 1).

According to one aspect of the present invention, an allocation apparatus (111 in FIG. 1A), performs control such that, depending on to which carrier or user traffic to be transferred to a VNF belongs, a virtual machine realizing the VNF or a dedicated apparatus (120 in FIG. 1A) is allocated as a forwarding destination of the traffic. Namely, the allocation apparatus controls the allocation of the VNF (VM) or the dedicated apparatus (120 in FIG. 1A) as a forwarding destination, according to a service level that is set with respect to at least one of a carrier (for example, an MNO or MVNO carrier), a user, contents of the traffic, and the like. Alternatively, the allocation apparatus may determine the allocation of a VNF as a forwarding destination, based on a type of a user terminal (mobile terminal) which is a transmission source or destination of the traffic.

The allocation apparatus (111 in FIG. 1A) may control the allocation of traffic to a VNF on a per virtual machine (VM) basis, on which the VNF runs. In this case, for example, a plurality of groups, each of which includes at least one virtual machine (VM), in correspondence with functions, are arranged (in this case, for example, VNFs that operate on the virtual machines (VMs) in the same group provide the same function). The allocation apparatus may select one of the plurality of groups and select a virtual machine from the group in accordance with a predetermined scheduling algorithm (for example, in a random scheduling in which a virtual machine is randomly allocated or in a round-robin scheduling in which a virtual machine is sequentially allocated). Next, the allocation apparatus may set the selected virtual machine to an allocation target of the traffic.

The allocation apparatus (111 in FIG. 1A) may be configured to hold a correspondence between a VNF and a virtual machine (VM) that realizes the VNF in a table or the like and to forward traffic to a virtual machine (VM), on which runs the VNF which is a allocation target of the traffic. In addition, for example, as in the case wherein a single VNF is composed by a combination of a plurality of VNFCs (Virtual Network Function Components) and the plurality of VNFCs correspond to a plurality of virtual machines (VMs), there is a case wherein a single VNF is executed by a plurality of virtual machines (VMs). In this case, the allocation apparatus (111 in FIG. 1A) may be configured to store and hold in advance a correspondence between a VNF and a virtual machine (VM) of a traffic forwarding destination, out of a plurality of virtual machines (VMs) which executes the VNF.

Alternatively, the allocation apparatus (111 in FIG. 1A) may set identification information of a traffic allocation destination VNF (or identification information of a VDU (Virtual Deployment Unit)) in an unused region in a header of a packet to be forwarded (for example, in a unused field such as bit fields of TOS (Type of Service) or flags in an IP header) and may forward the identification information to a server apparatus (100 in FIG. 1A). A control unit (a hypervisor, for example) of the server apparatus (100 in FIG. 1A) may analyze, for example, a header of the packet, and may determine a forwarding destination VNF of the packet to forward the packet to the VNF via a virtual switch (vSwitch) or the like, that realizes the VNF.

Alternatively, traffic allocation may be controlled on a per server apparatus (physical server) basis, on which a VNF is arranged. In this case, the allocation apparatus (111 in FIG. 1A) may be configured to store and hold in advance a correspondence between a VNF and a server apparatus (server apparatus of a traffic forwarding destination) on which the VNF is arranged.

In addition, when the traffic allocation destination is controlled on a per server apparatus (physical server) basis, for example, there may be arranged a plurality of groups, each of which includes one or a plurality of server apparatuses, in correspondence with functions (in this case, the server apparatuses in the same group provide the same function). First, one of the plurality of groups may be selected, and then, one of the server apparatuses may be selected from the group in accordance with a predetermined scheduling algorithm (for example, in a random scheme or a round-robin scheme).

Figure 19A:
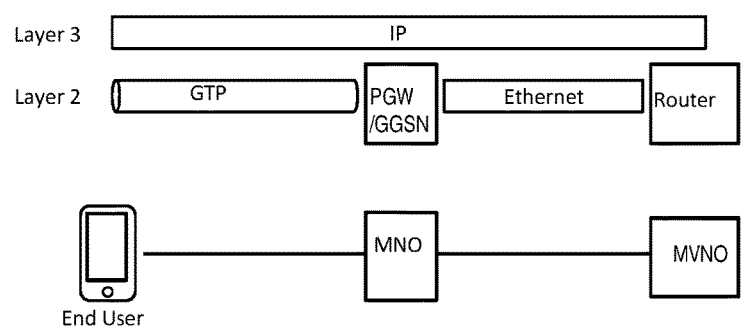
FIG. 19A and FIG. 19B are diagrams illustrating an MVNO of L3 connection.
Figure 19B:
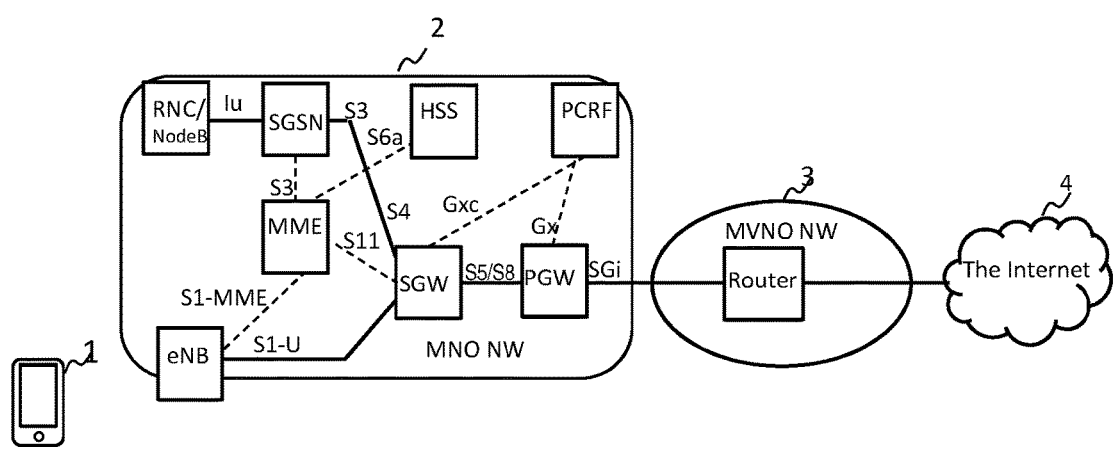

Referring to FIG. 1A, the server apparatus (physical server) 100 includes a control unit 101, a plurality of virtual machines (VMs) 102, and a plurality of VNFs 103. For example, a plurality of VNFs 103 (VNF 1B, VNF 1C) may be the same kind of virtual network function with different performance. In this specification, for example, in "VNF 1A," "VNF 1B," "VNF 1C," etc., "1" represents a function and "A," "B," and "C" represent performance classes. Though not particularly limited thereto, a VNF 103 may be obtained by virtualizing a network apparatus or a part thereof. For example, VNFs 103B and 103C may be obtained by virtualizing a part or the whole of a function such as a PGW in the MVNO network 3 in FIG. 20B and implementing the virtual function as an application software that runs on the corresponding virtual machine (VM). In this case, for example, the dedicated apparatus 120 may be configured by a PGW (a Non-NFV: an apparatus or a node that is not a VNF obtained by virtualizing a network function). Alternatively, a part or the whole of a function such as a router in the MVNO network 3 in FIG. 19B or a server not illustrated may be virtualized, and the virtual function may be implemented as an application software that runs on a virtual machine (VM). For example, the number of VNFs 103 is not particularly limited. A plurality of dedicated apparatuses 120 may be arranged.

The control unit 101 of the server apparatus (physical server) 100 includes a virtualization layer such as a hypervisor that virtualizes hardware resources (HW) 104 such as a CPU (Central Processing Unit), a memory such as a RAM (Random Access Memory), a storage such as an HDD (Hard Disk Drive), and a network interface controller (NIC) and that allocates the virtualized hardware resources to the virtual machine(s) (VM(s)).

FIG. 1A illustrates an example in which the control unit 101 includes a virtual switch (vSwitch) as virtual hardware, only for ease of explanation. For example, when the control unit 101 and the hardware resources (HW) 104 comply with the standard specification of NFV, the control unit 101 and the hardware resources (HW) 104 form an NFVI that provides a virtualization infrastructure for executing a virtual machine(s) (VM(s)) for a VNF(s). For example, regarding setting of a virtual machine(s) (VM(s)), instantiation, termination, scaling, updating and so forth of a VNF, an NFVI is controlled by a VIM (Virtualization Infrastructure Manager) of a NFV-MANO (Management and Orchestration) (not illustrated).

For example, a VNF 1A (not illustrated) is of a high function (performance) type, the VNF 1B 103B is of a medium (standard) function (performance) type, and the VNF 1C 103C is of a low function (performance) type, though not particularly limited thereto. By performing registration of a VNF package (on-boarding VNF Package) or updating on an NFV management apparatus (NFV-MANO (including an NFV Orchestrator (NFVO), a VNF Manager (VNFM), and a VIM)), from a maintenance terminal, an OSS (Operations Support Systems), or the like (not illustrated), setting or updating of a VM image (an image file of a virtual machine VM) corresponding to a VNF is performed. For example, the processing performance of a VNF is controlled by the number of virtual CPUs (vCPUs) allocated to a virtual machine (VM) on which the VNF runs, a virtual memory capacity, the number of virtual NICs and a bandwidth thereof, a virtual storage capacity and so forth. These are set by definition information of a VNF descriptor that is referred to when instance information about a VNF or the like is generated by the NFV Orchestrator (NFVO) (reference may be made to NPL 1, for details).

In the example illustrated in FIG. 1B, while the service level of a carrier A (an MVNO carrier) is a first service level (high speed, high quality), it is an expensive contract. The carrier A may be an MNO carrier that possesses communication facilities including the dedicated apparatus 120. Alternatively, the carrier A may be an MVNO carrier that possesses the dedicated apparatus 120. The service level of a carrier C (an MVNO carrier) is a third service level (low speed, low quality). The service level of a carrier B (an MVNO carrier) is a second service level, which is between the first and third service levels.

In this case, the allocation apparatus 111 allocates traffics of the carriers A, B and C to the dedicated apparatus 120, the VNF 1B, and the VNF 1C, respectively.

Namely, the traffics of the carriers A, B and C (the traffic from the terminals having contracts with the carriers A, B, and C, respectively) are forwarded from the allocation apparatus 111 to the dedicated apparatus 120 and virtual machine (VMs) that realize VNF 1B and VNF 1C, respectively, and processed by the respective dedicated apparatus 120, VNF 1B, and VNF 1C.

When traffic is forwarded to a virtual machine that realizes a VNF, for example, a frame (a packet) received by the NIC or the like of the server apparatus 100 is transmitted to a virtual machine (VM) that realizes the corresponding VNF via the virtual switch (vSwitch) or the like. Packet (frame) data from a VNF may be forwarded to a router in the MVNO network via the virtual switch, the NIC, etc. of the server apparatus 100 and is next forwarded to a destination via a packet data network or the like such as the Internet or an IMS network.

According to one mode of the present invention, the allocation of traffic to a VNF that processes the traffic is controlled for each carrier corresponding to a service level. Namely, for example, depending on the carrier, the allocation apparatus 111 in FIG. 1A changes the allocation destination of a user traffic among the dedicated apparatus 120, and the VNF 103B to the VNF 103C. For example, when the carrier A is an MNO lending its communication facilities to an MVNO carrier, the user traffic of the MNO carrier A is allocated to the dedicated apparatus 120 or a high-performance (or the highest-performance) VNF among the plurality of VNFs having the same function.

The service levels in FIG. 1B are simply for the purpose of description. The number of service levels is, as a matter of course, not limited to three. In addition, for finer classification, a granularity of the service level may be increased in view of, for example, a relationship between a combination of communication speed (bandwidth) (downlink speed), QoS (Quality of Service) and a contract price. For example, the following service levels may be set on a per carrier basis:
high speed and high quality: high price;
high speed and medium quality: relatively high price;
medium speed and medium quality: medium price;
medium speed and low quality: medium price;
low speed and medium quality: relatively low price; and
low speed and low quality: low price.

In this case, the allocation apparatus 111 may allocate traffic to a high-performance VNF among the plurality of VNFs having the same function or the dedicated device 120 for a MVNO carrier of the high-price contract among MVNO carriers. On the other hand, in the case of a MVNO carrier with a low-price contract, traffic may be allocated to one with lower performance among a plurality of VNFs having the same function.

When traffic allocation is performed on a per carrier basis, traffics of terminals of a plurality of subscribers of the same carrier are allocated to the same allocation destination. Alternatively, as will be described in example embodiments below, an allocation of traffic to a VNF may be performed on a per user basis, instead of on a per carrier basis. In the case where an allocation of traffic to a VNF on a per user basis is performed, for example, even if subscribers belong to the same carrier, a service level is set on a per subscriber (user) depending on a contract or the like thereof. As a result, there may be a case wherein traffics of a plurality of subscribers of the same carrier (for example, users of an MVNO) are allocated to different VNFs or to the dedicated apparatus 120.

In addition, in FIG. 1A, a plurality of virtual machines (VMs) on which a plurality of VNFs run may be mounted on different server apparatuses, respectively, and an allocation of traffic to a VNF may be performed on a per server basis or on a per user basis.

Figures 2A, 2B:
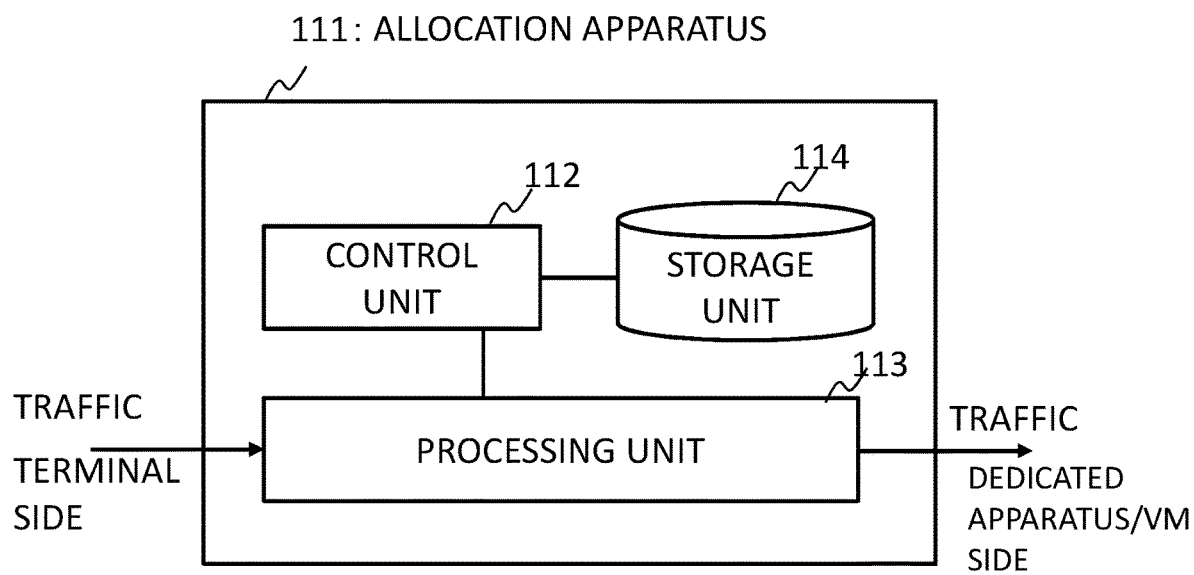
FIG. 2A and FIG. 2B are diagrams illustrating an example of an allocation apparatus in FIG. 1.

According to one mode of the present invention, more flexible control can be performed by controlling the allocation of a VNF on a per carrier basis or on a per user basis, and effective utilization of resources can be achieved FIG. 2A schematically illustrates an example of a configuration of the allocation apparatus 111 in FIG. 1A. The allocation apparatus 111 includes a control unit 112, a processing unit 113, and a storage unit 114. FIG. 2B schematically illustrates information stored in the storage unit 114.

The control unit 112 of the allocation apparatus 111 refers to terminal identification information (address information) included in a header of a received packet, identifies a terminal that has transmitted the packet, and controls the processing unit 113 so as to forward the packet to a virtual machine that realizes a VNF corresponding to the terminal.

The processing unit 113 of the allocation apparatus 111 sets an address (for example, a MAC (Media Access Control) address) of the dedicated apparatus 120 in a header of a packet (frame) transmitted from the terminal as information about the transmission destination, under controlled of the control unit 112. Alternatively, when the allocation apparatus 111 transmits a packet (frame) to an allocation destination VNF, the processing unit 113 may set identification information of a virtual machine (VM) that realizes the VNF (for example, a host name of the virtual machine, an IP/MAC address of the corresponding virtual NIC (vNIC), etc.), or, may transmit the packet (frame) to a transmission port destined to the destination virtual machine.

For example, as illustrated in FIG. 2B, the storage unit 114 of the allocation apparatus 111 stores correspondence between terminal identification information (for example, an address, etc.) and an allocation destination VNF as a table structure. Regarding the correspondence between the terminal identification information (addresses) and the allocation destination VNFs stored in the storage unit 114, the following variation is possible. For example, when attach processing or the like in which a terminal performs registration on a network via a base station is performed, for example, based on user's contract information stored in an HSS or the like, as needed, the control unit 112 may associate a carrier (MNO/MVNO), with which the terminal has a contract, with the terminal identification information (address) of the terminal and store a correspondence between the terminal identification information (address) and an allocation destination VNF corresponding to the carrier in the storage unit 114. The allocation apparatus 111 may perform processing for storing terminal identification information (address) and an allocation destination VNF in the storage unit 114, when an EPS (Evolved Packet System) session is established after authentication by an MME in the above attach processing. A session creation request (Create Session Request) is transmitted from an MME to an SGW, and the session creation request (Create Session Request) is transmitted from the SGW to a PGW. As a result, a tunnel is established between the SWG and the PGW. An attach request message transmitted from the terminal to the MME includes IMSI (International Mobile Subscriber Identity), which is subscriber identification information, and the session creation request (Create Session Request) message transmitted from the MME to the SGW and from the SGW to the PGW includes IMSI. For example, the allocation apparatus 111 may capture this session creation request message to acquire IMSI. In addition, the allocation apparatus 111 refers to contract information or the like of the subscriber from an HSS and determines a carrier (MNO/MVNO carrier, for example) with which the subscriber has a contract. The allocation apparatus 111 may determine the allocation destination VNF of a terminal traffic (data traffic, for example) on a per carrier basis, based on an allocation rule. For example, based on the allocation rule, the allocation apparatus 111 may determine the dedicated apparatus to be the allocation destination, when the carrier is an MNO or an MVNO with a high-price contract, while the allocation apparatus 111 may determine the VNFC or VNFB to be the allocation destination, when the carrier is an MVNO with a low-price contract or a medium-price contract. Alternatively, the allocation apparatus 111 may refer to service contract information in an SPR (Service Profile Repository) from IMSI to determine the traffic allocation destination on a per user basis, based the service contract of the subscriber (user). Alternatively, the MME or the like may determine an allocation destination of a terminal traffic (data traffic, for example) from contract information or the like of the subscriber from the HSS, based on IMSI to notify the allocation apparatus 111 of the determined allocation destination. Since the storage unit 114 stores an IP address of the terminal and the allocation destination VNF in association with each other, the allocation apparatus 111 can determine the forwarding destination VNF of a relevant packet by using, for example, an IP address in a packet header, as the terminal identification information. In addition, the allocation apparatus 111 may hold a correspondence between the VNF and identification information of a server apparatus in which the VNF is arranged, or a virtual machine (VM) that realizes the VNF (for example, a host name, or an IP/MAC (Media Access Control) address of a virtual NIC (vNIC)), as a correspondence between terminal identification information (address) and an allocation destination VNF (a packet forwarding destination VNF) that corresponds to the carrier.

With this configuration, a forwarding destination (a dedicated apparatus or a VNF) of a packet forwarded from a terminal after connection of the terminal is established, is determined based on transmission source address information (source IP address: IP address of the terminal) extracted from a header of the packet, and the correspondence between the terminal address and the allocation destination stored in the storage unit 114, and the packet is forwarded by the processing unit 113 to the dedicated apparatus 120, or, a server apparatus or a virtual machine (VM) on which the corresponding VNF runs. The processing unit 113 may be configured as a switch including an input port and a plurality of output ports. In the following, a description will be made at first to an example in which a traffic allocation destination is selected from a plurality of VNFs Example Embodiment 1

Figure 3:
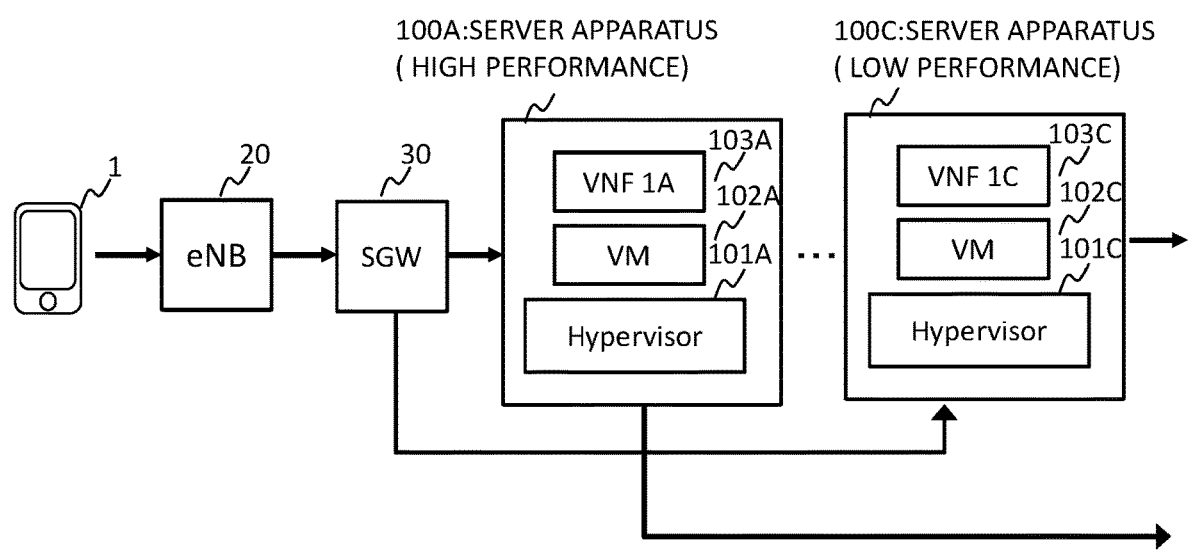
FIG. 3 is a diagram illustrating example embodiment 1 of the present invention.

FIG. 3 illustrates a configuration according to example embodiment 1. A terminal 1 and a base station (eNB) 20 in FIG. 3 are the same as those described with reference to FIG. 20A and so forth. In FIG. 3, while an SGW 30 has the same basic configuration as that described with reference to FIG. 20A and so forth, the SGW 30 includes the function of the allocation apparatus 111 described with reference to FIG. 1 and FIG. 2.

Figure 20A:
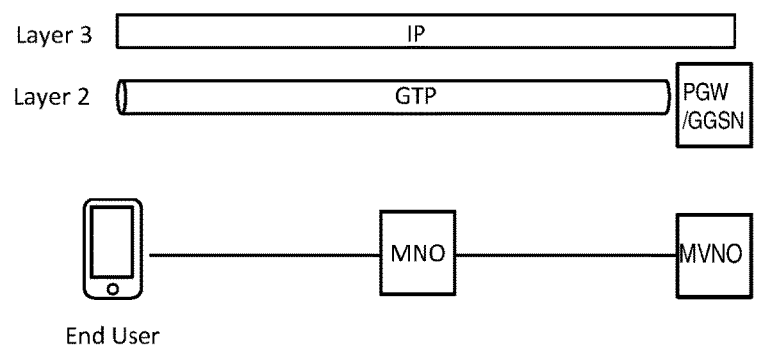
FIG. 20A and FIG. 20B are diagrams illustrating an MVNO of L2 connection.
Figure 20B:
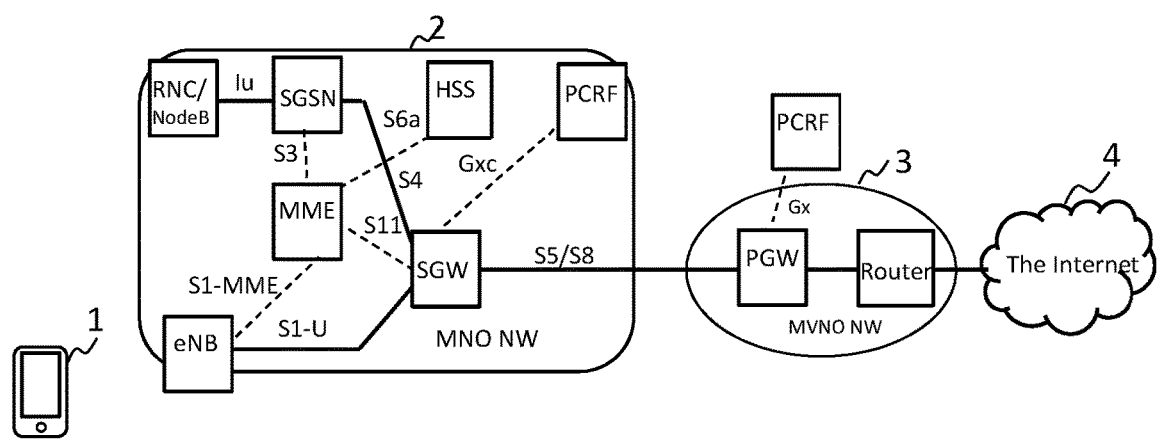

In FIG. 3, the terminal 1 (mobile terminal) wirelessly connects to the base station (eNB) 20 to establish a network connection and connects to a destination node (a node (not illustrated) in the Internet 40 in FIG. 20A, for example).

In example embodiment 1, VNF 1A to VNF 1C, each of which has the same function and different performance, are implemented on server apparatuses 100A to 100C, respectively, and an allocation of traffic to a VNF is controlled on a per server apparatus (physical server) basis. VNF 1A to VNF 1C implemented on the server apparatuses 100A to 100C may realize a part or all of the functions of a PGW (for example, see FIG. 19B or FIG. 20B) or realize a firewall, a load balancer, or, other server function, though not limited thereto.

A performance of the server apparatus 100A is relatively high, and a performance of the server apparatus 100C is relatively low (the performance of the server apparatus 100C is lower than that of the server apparatus 100A). In addition, one or a plurality of server apparatuses 100B (not illustrated) whose performance is between the performance of the server apparatus 100A and the performance of the server apparatus 100C may be arranged between the server apparatus 100A and the server apparatus 100C. The number of server apparatuses is not particularly limited.

In FIG. 3, the SGW 30 selects. on a per carrier basis (for example, MVNO, MNO and MVNO), a server apparatus on which a corresponding VNF is arranged (wherein a virtual machine (VM) on which a VNF runs, is arranged on the server apparatus). The SGW 30 forwards traffic to a server apparatus on which a VNF allocated as a destination is arranged (one of the server apparatuses 100A to 100C). The server apparatus forwards a received traffic via a hypervisor or the like provided thereon to the virtual machine (VM) on which the VNF runs.

The SGW 30 includes the function of the allocation apparatus 111 described with reference to FIG. 2. The SGW 30 allocates traffic corresponding to an MNO or a high price MVNO carrier to the VNF 1A installed in the high-performance server apparatus 100A. As will be described in an example below, the SGW 30 may allocate traffic corresponding to the high-price-contract MVNO carrier to a dedicated apparatus (using no NFV). Traffic of a user of a carrier including a dedicated apparatus may be allocated to the dedicated apparatus.

The SGW 30 allocates traffic corresponding to a low-price-contract MVNO carrier to a general-purpose server (a general-purpose server on which a plurality of VNFs are provided in a mixed manner: a processing performance of each VNF is low), or the VNF 1C included in the low-performance server apparatus 100C.

Alternatively, in FIG. 3, the SGW 30 may allocate traffic to a VNF on a per user basis. Namely, the SGW 30 may allocate traffic of a user whose service class is high to the VNF 1A installed in the high-performance server apparatus 100A. It is noted that the SGW 30 may allocate traffic to a dedicated apparatus (using no NFV) on a per user basis. Namely, the SGW 30 may allocate traffic of a user whose service class is low to the VNF 1C installed in the low-performance server apparatus 100C.

Alternatively, for example, among a plurality of users having their contracts with the same carrier, traffic of a user having a high-price contract may be allocated to the VNF 1A installed in the high-performance server apparatus 100A, while traffic of a user having a low-price contract may be allocated to the VNF 1C installed in the low-performance server apparatus 100C.

In the example embodiment 1, the allocation of a VNF is controlled on a per server apparatus basis. In addition, the VNF to which traffic is allocated is determined per carrier or per user. Thus, since it is only necessary to select a server apparatus including the VNF determined per carrier or per user, the allocation control, etc. are simplified.

As a variation of example embodiment 1, a plurality of server apparatuses may be divided into groups to form server apparatus groups. In this case, for example, the server apparatus groups may be configured by dividing a plurality of server apparatuses into a plurality of groups according to function or the like (for example, the grouping may be performed so that a plurality of server apparatuses having the same function belong to the same group).

In this variation, when the SGW 30 selects a server apparatus to which traffic is allocated, the SGW 30 may, at first, select one of the plurality of server apparatus groups, according to a service level. Next, from the selected server apparatus group, the SGW 30 may select one of the server apparatuses and allocate the traffic to the selected server apparatus. The selection of a server apparatus in a group may be performed randomly. Alternatively, the previously selected server apparatus may be selected continuously (a previously (last) allocated server apparatus is re-selected, and as a result, the allocation of the traffic is continued). Alternatively, the selection of a server apparatus may be performed in a round-robin scheme or the like. A single server apparatus group may include at least one server apparatus. For example, when the server apparatuses within the same group provide the same function, VNFs in one or more server apparatuses within the same group have the same function (Network Function). The plurality of server apparatus within the same group may have different performances (the server apparatuses in the same group may have the same function but different performances) or may have the same performance (all server apparatuses in the same group may have the same function and the same performance).

For example, a plurality of server apparatus groups (groups A, B and C), each of which has a different performance class, may be provided in correspondence with a plurality of carriers (carriers A, B and C). In accordance with a carrier (for example, carrier A) with which a subscriber has a contract, one (for example, group A) of the plurality of server apparatus groups is selected and then out of the selected server apparatus group (for example, group A), one server apparatus corresponding to a performance according to content of the contract of the subscriber is selected.

<Another Example of Allocation>

For example, a M2M (Machine to Machine) terminal is assumed to have, small amount of communication; and small communication frequency.

Thus, it can be said that no particular problems will occur even if traffic of an M2M terminal is cased to flow through a path with low throughput. For this reason, when the terminal 1 is an M2M terminal in FIG. 3, traffic of the M2M terminal is allocated to the VNF 1C in the low-performance server apparatus 100C. In this case, for example, when the M2M terminal established connection by (when attach processing is performed), the traffic from the M2M terminal may be allocated to the VNF 1C of the low-performance server apparatus 100C on a per packet basis, from correspondence between a type of the M2M terminal and an address information of a transmission source of a packet, based on terminal information (terminal identification information, a terminal type, etc.) acquired by the eNB 20.

Traffic from a mobile terminal or the like, other than the M2M terminals is allocated to the VNF 1A 103A installed on the high-performance server apparatus 100A. The reason for this is that since a mobile terminal such as a smartphone has communication amount larger than an M2M terminal and has communication frequency higher the M2M terminal (a larger communication amount and higher communication frequency, by downloading of a moving picture to the terminal 1, Twitter (a trademark or a registered trademark by Twitter, Inc.), Facebook (a registered trademark by Facebook, Inc.), etc.), the traffic from a mobile terminal is caused to flow through a path with higher throughput. A Traffic (downlink packet) addressed to the terminal 1 from a communication partner of the terminal 1 (a node connected to a packet data network such as the Internet or an IMS) is forwarded to a VNF (that virtually realizes a PGW function, for example) on a server apparatus allocated in correspondence with the carrier to which the terminal 1 subscribes, via a router (switch), etc. (for example, a Router on the MVNO network in FIG. 20B). Next, the traffic is transmitted from the VNF to the terminal 1 via the SGW 30 and the eNB 20. In this case, the router (switch), etc. may hold correspondence between terminal identification information and an allocation destination VNF as illustrated in FIG. 2B and forward a packet (downlink packet) addressed to the terminal 1 to a server apparatus on which a corresponding allocation destination VNF is arranged. VNFs 103A to 103C on the server apparatuses 100A to 100C in FIG. 3 each may, as a matter of course, be a VNF that processes only an uplink traffic in one direction from the terminal 1, such as a firewall function (a packet filter) that controls passage permission of a packet in an uplink direction from the terminal 1 (in this case, a packet addressed to the terminal 1 (downlink packet) is not forwarded to the VNF).

Example of Example Embodiment 1

Figure 4:
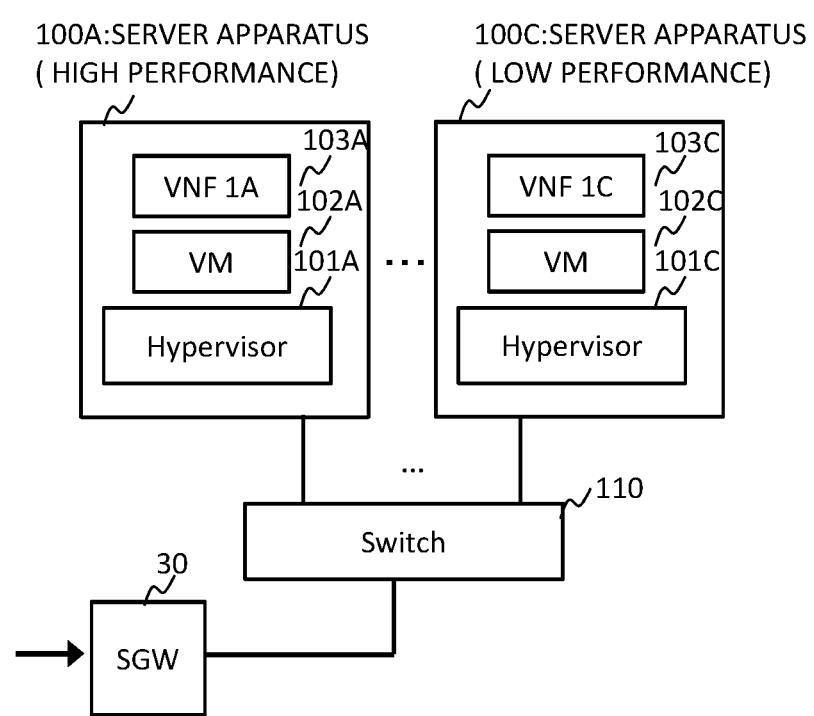
FIG. 4 is a diagram illustrating an example of example embodiment 1 of the present invention.

FIG. 4 illustrates an example of example embodiment 1 in FIG. 3. In FIG. 4, illustration of the terminal 1 and the base station (eNB) 20 in FIG. 3 is omitted. In the example in FIG. 4, a switch (physical switch) 110 selects one of the server apparatuses 100A to 100C. In this case, the SGW 30 and the switch 110 correspond to the allocation apparatus 111 in FIG. 1A.

In FIG. 4, from the server apparatuses 100A to 100C, the SGW 30 selects a server apparatus on which is arranged a destination VNF to which traffic is allocated on a per carrier basis or on a per user basis. The SGW 30 forwards traffic to the selected server apparatus via the switch 110. The SGW 30 may forward a frame with a header in which identification information (for example, a MAC address) of the selected server apparatus is set, to the switch 110. The switch 110 manages a correspondence between a port number and a MAC address of a server apparatus connected to the port in a table, and forwards the frame to a port connected to a server apparatus which is a forwarding destination of the frame, based on a destination MAC address of a frame header.

Example Embodiment 1-1

Figures 5A, 5B:
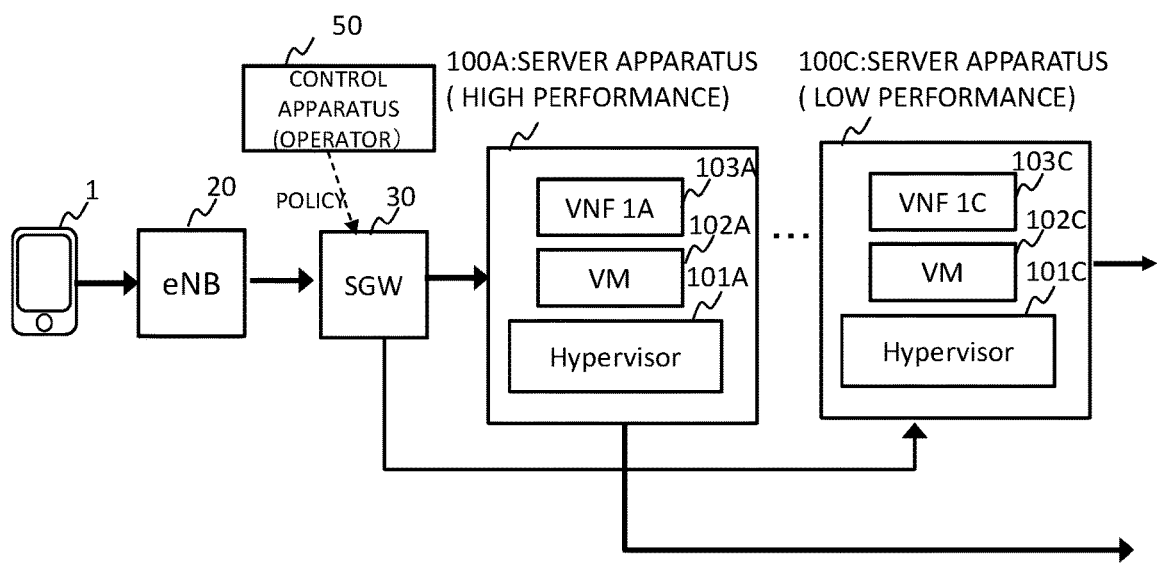
FIG. 5A and FIG. 5B are diagrams illustrating example embodiment 1-1 of the present invention.

FIGS. 5A and B illustrate example embodiment 1-1. Example embodiment 1-1 is a specific example of example embodiment 1. In example embodiment 1-1, as in example embodiment 1, the allocation of a VNF is controlled on a per server apparatus (physical server) basis. As illustrated in FIG. 5A, in example embodiment 1-1, the SGW 30 controls allocation of traffic to a VNF on a per carrier basis, based on a policy set by a control apparatus (or an operator) 50. In FIG. 5A, for example, the control apparatus 50 and the SGW 30 realize the function of the allocation apparatus 111 as described with reference to FIG. 1 and FIG. 2.

The SGW 30 forwards traffic to a server apparatus on which is arranged an allocated VNF. The server apparatus forwards a received traffic to a virtual machine (VM) on which the VNF runs via a hypervisor or the like provided on the server apparatus.

FIG. 5B illustrates an example of a policy set by the control apparatus (or the operator) 50. As illustrated in FIG. 5B, traffic is allocated to a VNF, in accordance with a service level set on a per carrier basis. Since a way of allocation is the same as that described with reference to FIG. 1B, description thereof will be omitted. In the following example embodiments, the carrier A may be an MNO or an MVNO. Likewise, the carrier B, etc. are not limited to only MVNOs.

As described above, in example embodiment 1-1, the control apparatus (or operator) 50 sets a policy in the SGW 30 which performs allocation of traffic to a VNF according to the service level set on a per carrier basis. Thus, for example, variably setting (update setting) of a policy to the SGW 30 makes it possible to variably set correspondence among a carrier, a service level, and an allocated VNF. This enables effective and appropriate utilization of resources of a server apparatus.

Variation of Example Embodiment 1-1

Figure 6:
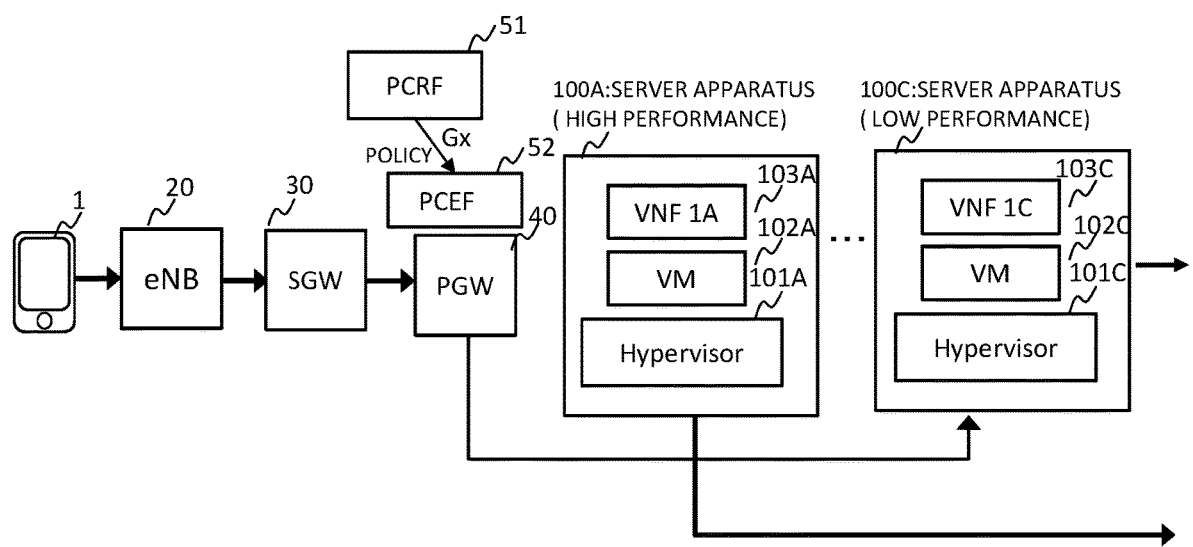
FIG. 6 is a diagram illustrating a variation of example embodiment 1-1 of the present invention.

FIG. 6 illustrates a variation of example embodiment 1-1. In this variation, a configuration example in which a PCRF 51 and a PCEF (Policy and Enforcement Function) 52 constitute a control apparatus and a PGW 40 performs allocation of traffic will be described. In FIG. 6, the PCEF 52, in cooperation with an OCS (Online Charging System) not illustrated and the PCRF 51, applies a policy to a communication (traffic) that passes through the PGW 40. In FIG. 6, for example, the PCRF 51 and the PGW 40 realize the function of the allocation apparatus 111 described with reference to FIGS. 1 and 2.

The PCEF 52 controls carrier traffic that passes through the PGW 40, for example, based on a high-speed policy, a low-speed policy, etc. The PCEF 52 may be implemented inside the PGW 40.

In the configuration example in FIG. 6, the PGW 40 may allocate traffic on a per carrier basis. In addition, based on policy control information sent from the PCRF 51 via a Gxc interface, for example, the PGW 40 perform allocation of a VNF on a per server apparatus basis according to a service level of a carrier to select a server apparatus on which is arranged an allocated VNF. In this case, under control of the PCEF 52, for example, the PGW 40 may perform VNF allocation on a per server apparatus basis, according to a corresponding one of different service levels, for each of users who subscribes to the same carrier. For example, with respect to a prepaid type charge plan (contract) for a user, the PCRF 51 which has acquired an allowable communication amount from an OCS (not shown) which manages communication amount and converts the communication amount into a prepaid balance decides the a communication policy (communication speed), and the PCEF 52 applies the policy to a user traffic in the PGW 40. For example, when there is still a certain communication amount left in a prepaid-type charging plan (for example, 2 GB (Gigabytes)), the PCEF 52 may apply a high-speed communication policy, and the user traffic may be allocated to the VNF 1A on the server apparatus 100A. When there is no communication amount left, for example, the PCEF 52 may perform switching to a low-speed communication policy such as 128 kbps (kilo bits per second) at a maximum, and the user traffic may be allocated to the VNF 1C on the server apparatus 100C. While the PCRF 51 and PCEF 52 in FIG. 6 constitute a variation of the control apparatus 50 in FIG. 5, setting of a policy and a policy based traffic allocation control scheme are not as a matter of course limited to the configuration illustrated in FIG. 6.

Example Embodiment 1-2

Figures 7A, 7B:
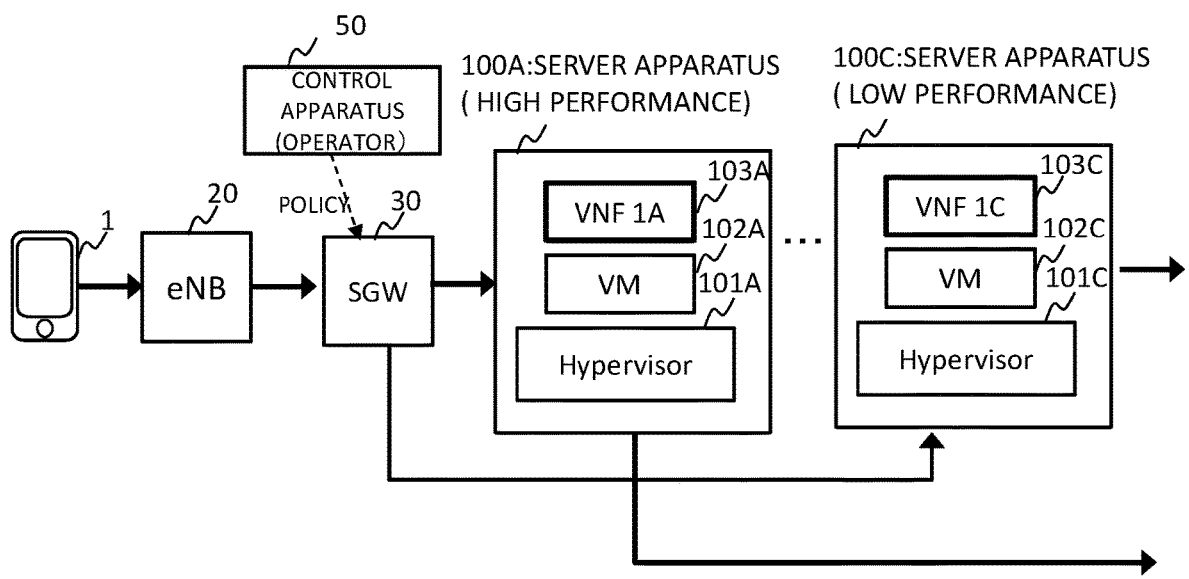
FIG. 7A and FIG. 7B are diagrams illustrating example embodiment 1-2 of the present invention.

FIGS. 7A and 7B illustrate example embodiment 1-2. Example embodiment 1-2 is a specific example of example embodiment 1. As in example embodiment 1, the SGW 30 allocates traffic to a VNF on a per server apparatus (physical server) basis.

As illustrated in FIGS. 7A and 7B, in example embodiment 1-2, control of traffic allocation to VNF on a per user basis (for each terminal identification information (terminal ID) or address of terminal 1) based on a policy set from the control apparatus (or operator) 50.

As the identification information of the terminal 1, identification information such as IMSI (International Mobile Subscriber Identity) stored in a SIM (Subscriber Identity Module) card of the terminal 1 and included in an attach request (Attachment request) message transmitted from the terminal 1 to the MME may be used.

As illustrated in FIG. 7A, in example embodiment 1-2, based on a policy set by the control device (or operator) 50, the SGW 30 controls traffic allocation to VNF for each user. The SGW 30 forwards traffic to a server apparatus on which is arranged an allocated VNF. The server apparatus forwards a received traffic, via a hypervisor or the like on the server apparatus, to a virtual machine (VM) on which the VNF runs.

FIG. 7B illustrates an example of the policies set by the control apparatus (or operator) 50. As illustrated in FIG. 7B, the SGW 30 controls allocation of traffic to a VNF, in accordance with a service level set on a per user basis (an ID or an address of terminal 1).

In the example in FIG. 7B, the SGW 30 allocates:

traffic from a terminal of a user 1 that subscribes to a carrier A, which is an MNO or MVNO carrier, to a high-speed server apparatus 100A on which a VNF 1A runs;

traffic from a terminal of a user 2 that subscribes to the carrier A to a medium-speed server apparatus 100B on which a VNF 1B runs; and traffic from a terminal of a user 3 that subscribes to an MVNO carrier B to a low-speed server apparatus 100C on which a VNF 1C runs.

As described above, in example embodiment 1-2, the control apparatus (or operator) 50 sets a policy in the SGW 30, which allocates traffic to a VNF, in accordance with a service level set on a per user basis. By variably setting a policy from the control apparatus (or the operator) 50, a correspondence among a user, a service level, and an allocation destination VNF of a user traffic can be variably set. This enables effective and appropriate utilization of resources of a server apparatus.

The control apparatus 50 illustrated in FIG. 7A may, as a matter of course, be configured by the PCRF 51 and the PCEF 52 as described with reference to FIG. 6. In this case, the PCRF 51 may set a policy with reference to a charging rule of a user, for example.

When the terminal 1 is an M2M terminal, a policy corresponding to a third service level in FIG. 7B may be applied, and traffic from the M2M terminal may be allocated to a low-speed server apparatus 100C on which is installed the VNF 1C. Traffic (downlink packet) addressed to the terminal 1 from a communication partner of the terminal 1 (a node connected to a packet data network such as the Internet or an IMS) is forwarded to a VNF (that virtually realizes a PGW function, for example) on a server apparatus allocated on a per user basis via a router (switch), etc. (for example, Router on the MVNO network in FIG. 20B). Next, the traffic is transmitted from the VNF to the terminal 1 via the SGW 30 and the eNB 20. In this case, the router (switch), etc. may hold a correspondence between a terminal address (user terminal IDs) and an allocation destination VNF as illustrated in FIG. 7B to forward a packet (downlink packet) addressed to the terminal 1 of a corresponding user to a server apparatus in which is provided an allocation destination VNF. It is needless to say that the VNFs 103A to 103C on the server apparatuses 100A to 100C in FIG. 7A may process only an uplink traffic in one direction from the terminal 1, by using a firewall function (packet filtering) that controls permission to pass a packet from the terminal 1 in an uplink direction (in this case, a packet (downlink packet) addressed to the terminal 1 is not forwarded to the VNF).

Example Embodiment 1-3

Figures 8A, 8B:
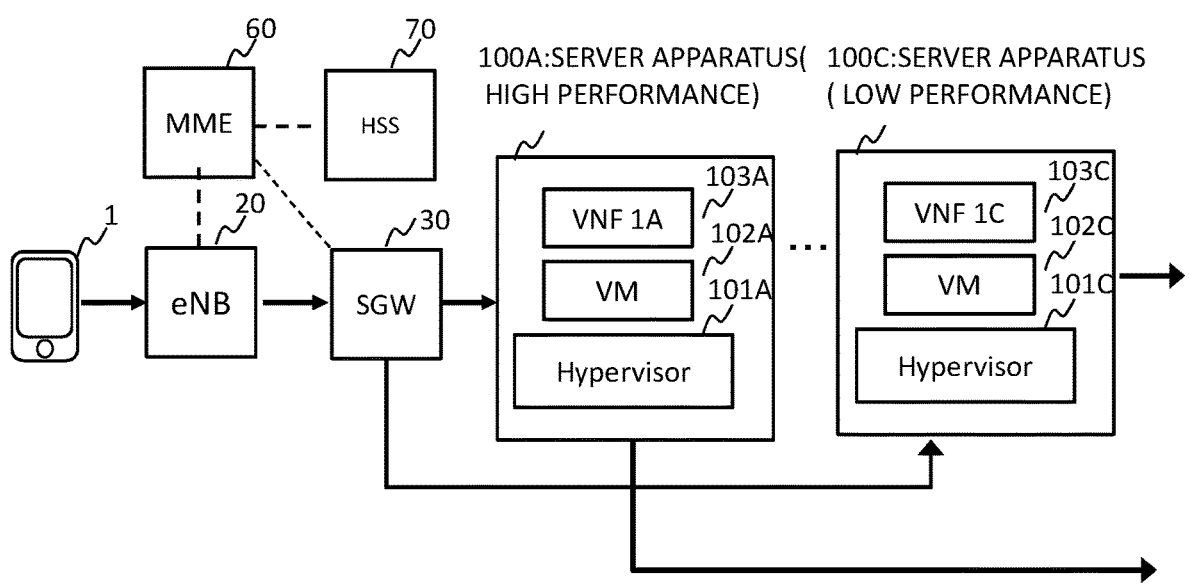
FIG. 8A and FIG. 8B are diagrams illustrating example embodiment 1-3 of the present invention.

FIGS. 8A and 8B illustrate example embodiment 1-3. Example embodiment 1-3 is a specific example of example embodiment 1. As in example embodiment 1, the allocation of traffic to a VNF is controlled on a per server apparatus (physical server) basis.

As illustrated in FIG. 8A, in example embodiment 1-3, based on subscriber information or service contract information (change of contract: for example, change of charging plan, addition of a prepaid fee, etc.) in an SPR (Subscriber Profile Repository) in an HSS 70, the SGW 30 controls the allocation of traffic to a VNF on a per user basis. The SGW 30 forwards traffic to a server apparatus on which is arranged an allocated VNF. The server apparatus forwards received traffic to a virtual machine (VM) on which the VNF runs via a hypervisor or the like on the server apparatus.

In FIG. 8A, an MME 60 performs, for example, authentication of the terminal 1 in coordination with the HSS 70, when attachment processing of the terminal 1 is performed. In an authentication Procedure, IMSI is included in an attachment request message transmitted from the terminal 1 to the MME 60. The MME 60 transmits an authentication information request including the IMSI and a serving network ID to the HSS 70, and the HSS 70 creates and transmits an authentication vector to the MME 60. The MME 60 transmits an authentication request to the terminal 1, and the terminal 1 authenticates the network and transmits an authentication response of the terminal 1 to the MME 60. The MME 60 compares a value (RES) of the authentication response from the terminal 1 with a value (XRES) included in the authentication vector from the HSS 70 and determines whether to authenticate the user. After this authentication, the MME may acquire subscriber profile information (service contract information, charging information, etc.) in the SPR (Subscriber Profile Repository) in the HSS 70 by using the IMSI of the terminal 1 and determine a user-specific traffic allocation destination VNF on a per server apparatus basis. Alternatively, after the authentication, the SGW 30 may acquire subscriber profile information (service contract information, charging information, etc.) of SPR in the HSS 70 by using the IMSI or the like included in a session creation request (Create Session Request) message transmitted from the MME 60 to the SGW 30 and determine a user-specific traffic allocation destination VNF on a per server apparatus basis. Alternatively, for example, based on a service policy (a service policy for a user) determined by a PCRF (not illustrated), the SGW 30 may determine a user-specific traffic allocation destination VNF on a per server apparatus basis. Alternatively, the base station (eNB) 20 may determine a user-specific traffic allocation destination on a per server apparatus basis. In such case, the base station (eNB) 20 may include the allocation apparatus 111 described with reference to FIG. 2.

FIG. 8B illustrates an example in which a VNF is allocated on a per user basis (for each terminal identification information (terminal ID) or address of the terminal 1). Since the allocation in FIG. 8B is the same as that described with the policies in FIG. 7B (the allocation of a VNF per user), description thereof will be omitted.

In example embodiment 1-3, the setting of the allocation of user traffic to a VNF may be changed, for example, based on service contract information (charging information) of a user in the HSS 70 and depending on the change of the contract of the user (for example: change of a changing plan, addition of a prepaid fee, etc.).

In example embodiment 1-3, for example, according to an increase of a monthly communication capacity due to addition of a prepaid fee, the setting of the allocation of user traffic to a VNF may be changed (for example, from a low-performance VNF to a high-performance VNF).

Alternatively, in example embodiment 1-3, with a change of content of a service contract of a user (upgrading, for example), the setting of the allocation of user traffic to a VNF may be changed in such a manner that the user traffic is allocated to a VNF having a further added function as compared with that of a currently selected VNF (scale-up, scale-out, etc.). Alternatively, with a change of content of the service contract of the user (downgrading, for example), the setting of the allocation of user traffic to a VNF may be changed in such a manner that the user traffic is allocated to a VNF having a function reduced from that of a currently selected VNF (scale-down, scale-in, etc.).

In addition, in example embodiment 1-3, for example, with an upgrade-change of content of a service contract of a user, a voice call function and an SMS (Short Message Service) function may be released. A service chain (deployment of a VNF and physical and virtual components supporting the VNF) may be reconfigured so that the traffic from the user is enabled to use a voice call and an SMS. In contrast, with a downgrade-change of content of a service contract of a user, a VNF service chain may be reconfigured so that a function(s) that has been set cannot be used.

According to example embodiment 1-3, user traffic can be allocated to a VNF in accordance with content of a service contract of a user. In addition, for example, an optimum VNF can be allocated so as to follow a change of content of the service contract.

In example embodiment 1-3, as described in example embodiment 1-2, when the terminal 1 is an M2M terminal, traffic from the M2M terminal may be allocated to the low-speed server apparatus 100C on which is arranged the VNF 1C in accordance with contract information of the M2M terminal.

Example Embodiment 1-4

Figures 9A, 9B:
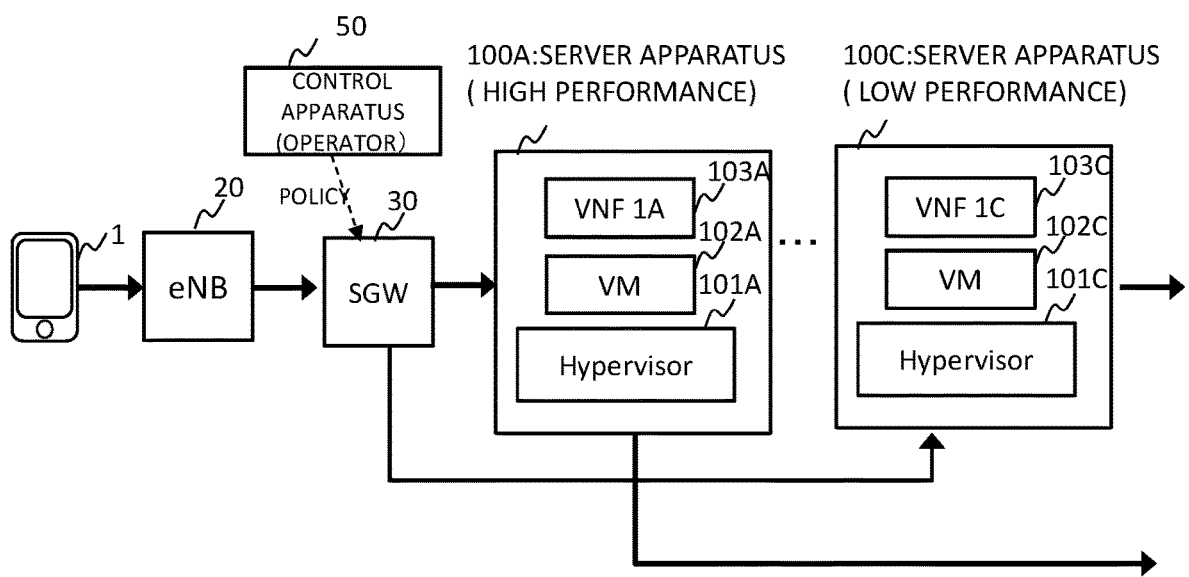
FIG. 9A and FIG. 9B are diagrams illustrating example embodiment 1-4 of the present invention.

FIGS. 9A and 9B illustrate example embodiment 1-4. Example embodiment 1-4 is a specific example of example embodiment 1. As in example embodiment 1, the allocation of traffic to a VNF is controlled on a per server apparatus (physical server) basis. As illustrated in FIGS. 9A and 9B, in example embodiment 1-4, based on a policy from the control apparatus 50, the SGW 30 selects a server apparatus on which an allocation destination VNF runs, out of the server apparatuses 100A to 100C on which VNFs run, based on contents of traffic or an application. The SGW 30 forwards traffic to a server apparatus on which is arranged an allocated VNF. The server apparatus forwards received traffic to a virtual machine (VM) on which the VNF runs via a hypervisor or the like on the server apparatus.

FIG. 9B lists policies as follows:

contents: YouTube (registered trademark) (HD (High Definition television)) which is high speed, a first service level, and allocation destination is VNF 1A;

contents: YouTube (registered trademark) (SD (Standard Definition television)) which is a low-speed, a third service level, and allocation destination is VNF 1C; and other video services, a second service level, and allocation destination is VNF 1B.

For example, content information or the like may be acquired by analyzing header (HTTP header) information in an HTTP (Hyper text Transport Protocol) request. For example, a URL (Uniform Resource Locator) of a content delivery source may be acquired from a host field (HTTP 1.1) or the like. Alternatively, a URI (Uniform Resource Identifier) indicating a unique location of contents may be acquired from Content-Location of an entity header. In addition, for example, by using Deep Packet Inspection for analyzing a payload portion of a packet or Stateful Deep Packet Inspection for checking a packet header portion, information on contents or an application may be extracted. Content information acquired may be matched with a policy to select a server apparatus on which is arranged a virtual machine (VM) realizing a traffic allocation destination VNF.

According to example embodiment 1-4, it is possible to allocate a VNF corresponding to contents to be forwarded or an application providing contents.

Example Embodiment 2

Figure 10:
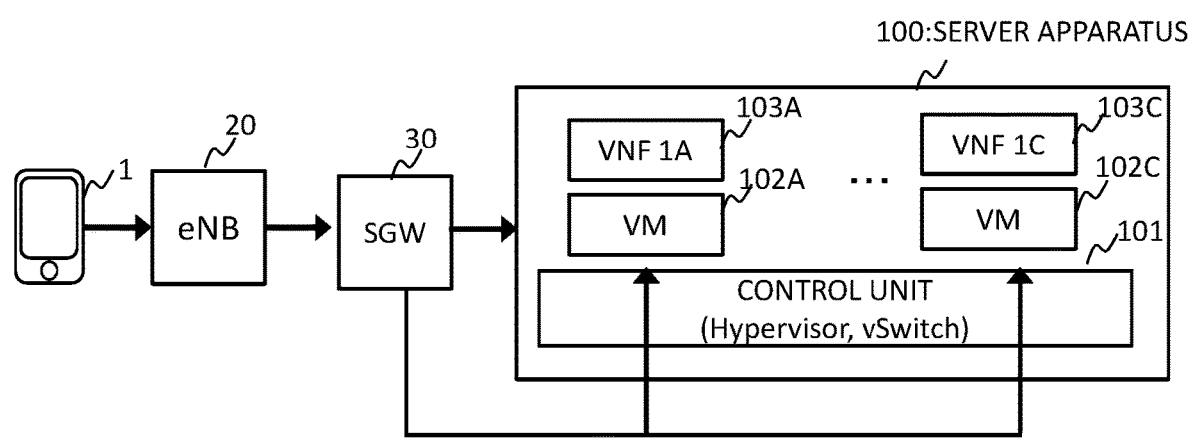
FIG. 10 is a diagram illustrating example embodiment 2 of the present invention.

FIG. 10 illustrates a configuration according to example embodiment 2. In example embodiment 2, the allocation of a VNF is controlled on a per virtual machine (VM) basis. For example, a plurality of VNFs (VNF 1A to VNF 1C) having the same function are implemented on separate virtual machines (VMs) on the same server apparatus. The number of virtual machines is not particularly limited. In the example in FIG. 10, virtual machines (VMs) 102A to 102C implemented on a virtualization layer such as a hypervisor (a control unit) 101 of a server apparatus 100 are provided, and the VNF 1A to VNF 1C run on the respective virtual machines (VMs) 102A to 102C. In FIG. 10, an SGW 30 includes the function of the allocation apparatus 111 described with reference to FIG. 1A and FIG. 2A.

A processing performance of the virtual machine 102A is relatively high, a processing performance of the virtual machine 102C is relatively low, and a processing performance of the virtual machine 102B not illustrated is a medium processing performance. A performance value of the virtual machine 102B is, for example, an intermediate value between performance values of the virtual machines 102A and 102C.

When the allocation of a VNF is performed on a per MVNO carrier basis, for example, traffic corresponding to a high-price-contract MVNO carrier is allocated to the VNF 1A that runs on a high-performance VM 102A. In contrast, traffic corresponding to a low-price-contract MVNO carrier is allocated to the VNF 1C that runs on the low-performance VM 102C.

When the allocation of a VNF is performed on a per user basis, based on service contract information of a user, user traffic of an upper service class is allocated to the VNF 1A that runs on the high-performance VM 102A. In contrast, user traffic of a lower service class is allocated to the VNF 1C that runs on the low-performance VM 102C.

The SGW 30 transmits traffic to the server apparatus 100. In this operation, the SGW 30 may set information (identification information or the like) specifying an allocated VFN in a packet header of the traffic (for example, in an unused bit field in an IP header) and may forward the traffic to the server apparatus 100. Alternatively, the SGW 30 may set a MAC address of a virtual machine (VM) on which an allocated VNF runs (a virtual MAC address allocated automatically in a software-based manner by a hypervisor when power-on of a VM is performed) in a frame header of the traffic and may forward the traffic to the server apparatus 100.

Among a plurality of VNF 1A to VNF 1C on the server apparatus, the server apparatus 100 forwards traffic received from the SGW 30 to a virtual machine (VM) on which a VNF allocated by the SGW 30 runs.

According to example embodiment 2, the allocation of a VNF is controlled on a per virtual machine (VM) basis. Thus, as compared with example embodiment 1 in which the allocation is controlled on a per server apparatus basis, example embodiment 2 enables reduction of server resource (for example, the number of server apparatuses) and thus, operation cost can be reduced.

Example of Example Embodiment 2

Figure 11:
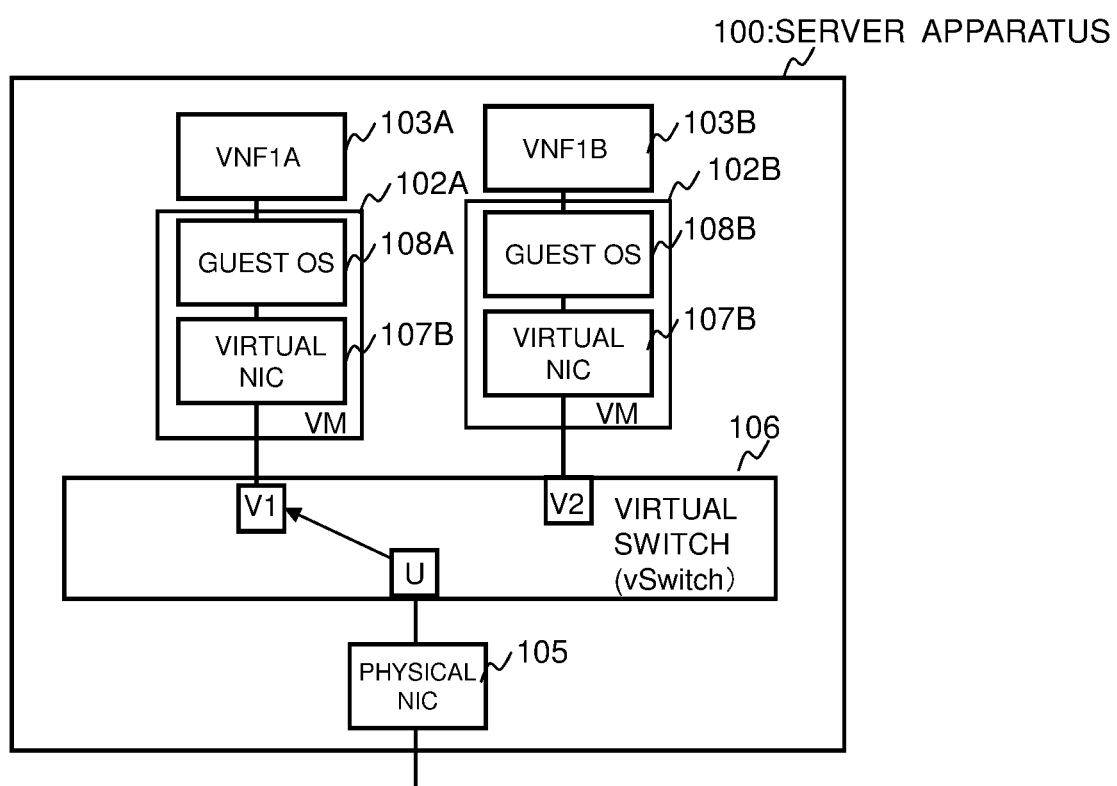
FIG. 11 is a diagram illustrating an example of example embodiment 2 of the present invention.

FIG. 11 schematically illustrates a configuration example of example embodiment 2. In the example in FIG. 11, a virtual switch (vSwitch) 106 in the server apparatus 100 forwards traffic received from the SGW 30 to a virtual machine (VM).

A frame (packet) from a physical NIC 105 is supplied to an input port (U) of the virtual switch 106. For example, the virtual switch 106 analyzes a frame header and determines an output port connected to the forwarding destination virtual machine (VM) based on a MAC address of a virtual machine (VM) that is set in a frame header by the SGW 30 or identification information that is set in a header by the SGW 30 (VNF identification information set in an unused bit field in a header or the like). The virtual switch 106 forwards the frame to a corresponding allocated VNF (application) that runs on a guest OS (Operating System) (device driver) via a virtual NIC and the guest OS in the virtual machine (VM). Data (packet data) processed by and outputted from a VNF is formed, for example, into a frame by a virtual NIC, is then transmitted via the virtual switch 106 and the physical NIC 105, to a forwarding destination in a MVNO network (the Router in the MVNO network in FIG. 20B, for example), and then is transmitted to the communication partner of the terminal 1 via a packet data network such as the Internet or the IMS. In FIG. 11, the virtual switch (vSwitch) 106 and the SGW 30 in FIG. 10 may constitute the allocation apparatus 111 in FIG. 1A. Though not particularly limited thereto, when a single VNF are realized by a plurality of virtual machines (VMs), among the plurality of VNFCs (VNF Components) constituting the VNF, traffic is forwarded to a virtual machine (VM) that realizes a VNFC connected to a virtual NIC (virtual network: external link).

Example Embodiment 2-1

Figures 12A, 12B:
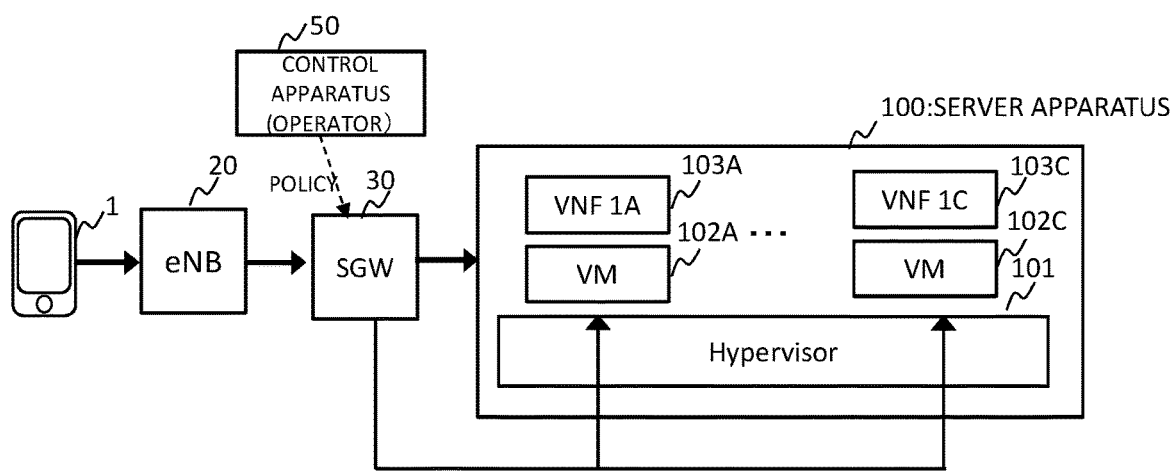
FIG. 12A and FIG. 12B are diagrams illustrating example embodiment 2-1 of the present invention.

FIGS. 12A and 12B illustrate example embodiment 2-1. Example embodiment 2-1 is a specific example of example embodiment 2. As in example embodiment 2, the allocation of a VNF is controlled on a per virtual machine (VM) basis.

As illustrated in FIG. 12A, in example embodiment 2-1, based on a policy set by a control apparatus (or operator) 50, the SGW 30 controls the allocation of traffic to a VNF for each carrier on a per virtual machine (VM) basis. The SGW 30 sets identification information (for example, a virtual MAC address) of a virtual machine (VM) in header information of a frame or packet so that the traffic is forwarded to the virtual machine (VM) on which an allocated VNF runs and forwards the traffic to the server apparatus 100. The server apparatus 100 forwards the traffic to the destination VNF, as described with reference to FIG. 11.

FIG. 12B illustrates an example of a policy set by the control apparatus (or the operator) 50. As illustrated in FIG. 12B, in accordance with a service level set on a per carrier basis, the SGW 30 controls the allocation of traffic to a VNF. Since a way of the allocation is the same as that described with reference to FIG. 5B, description thereof will be omitted.

In example embodiment 2-1, based on a policy set in the SGW 30 by the control apparatus (or operator) 50, the allocation of a VNF in accordance with a service level set on a per carrier basis is performed. By variably setting a policy from the control apparatus (or operator) 50, it is made possible to set variably a correspondence among an MVNO carrier, a service level, and a VNF. This enables effective and appropriate utilization of server resources.

In example embodiment 2-1, as in the variation of example embodiment 1-1 (see FIG. 6), the SGW 30 may allocate traffic to a virtual machine (group) on a per carrier basis, and the PGW 40 may perform the allocation of a VNF on a per virtual machine basis, in accordance with a service level, for the same carrier, based on policy control information or the like transmitted from a PCRF 51 via a Gxc interface.

Example Embodiment 2-2

Figures 13A, 13B:
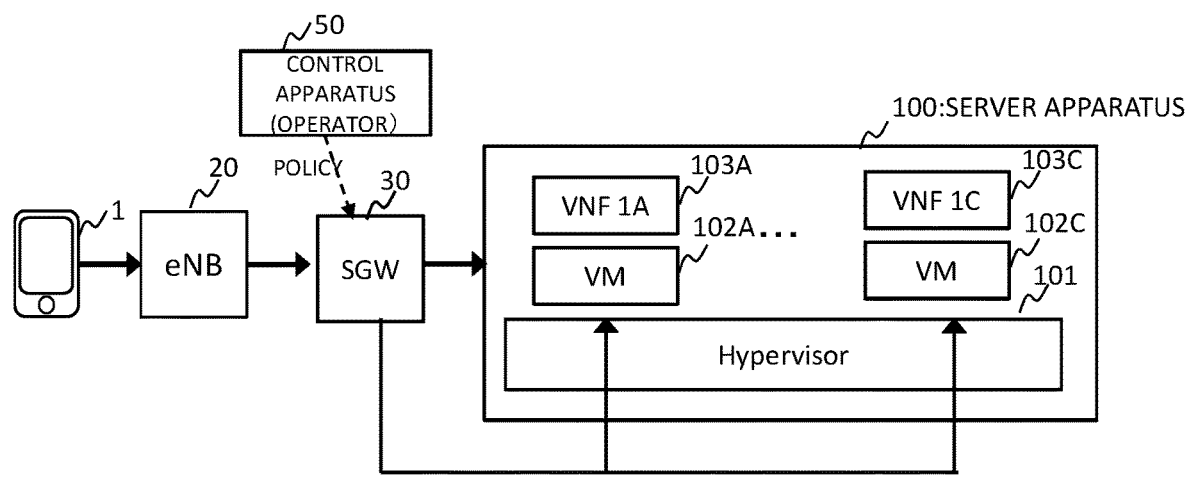
FIG. 13A and FIG. 13B are diagrams illustrating example embodiment 2-2 of the present invention.

FIGS. 13A and 13B illustrate example embodiment 2-2. Example embodiment 2-2 is a specific example of example embodiment 2. As in example embodiment 2, the allocation of a VNF is controlled on a per virtual machine (VM) basis.

As illustrated in FIGS. 13A and 13B, in example embodiment 2-2, based on a policy set by the control apparatus (or the operator) 50, the SGW 30 controls the allocation of traffic to a VNF on a per user basis (based on terminal identification information (a terminal ID) or an address of the terminal 1). As the identification information of the terminal 1, IMSI (International Mobile Subscriber Identity) stored in a SIM (Subscriber Identity Module) card of the terminal may be used. The SGW 30 sets identification information of a virtual machine on which an allocated VNF runs (for example, a virtual MAC address) in header information of a frame or packet so that the traffic is forwarded to the virtual machine (VM) and forwards the traffic to the server apparatus 100. The server apparatus 100 forwards the traffic to the destination VNF, as described with reference to FIG. 11.

As illustrated in FIG. 13A, in example embodiment 2-2, based on a policy set by the control apparatus (or operator) 50, the allocation of traffic to a VNF is performed for each user. FIG. 13B illustrates an example of a policy set by the control apparatus (or operator) 50. As illustrated in FIG. 13B, the allocation of traffic to a VNF is controlled in accordance with a service level set for each user (an ID or an address of the terminal 1). In the example in FIG. 13B:

traffic from a terminal of a user 1 that subscribes to a carrier A (MNO or MVNO) to a high-speed VM 102A on which a VNF 1A runs;

traffic from a terminal of a user 2 that subscribes to the carrier A (MNO or MVNO) to a medium-speed VM 102B on which a VNF 1B runs; and traffic from a terminal of a user 3 that subscribes to the carrier B (an MVNO carrier) to a low-speed VM 102C on which a VNF 1C runs.

In FIG. 13A, the control apparatus (or operator) 50 and the SGW 30 realize the function of the allocation apparatus 111 described with reference to FIG. 1A and FIG. 2A.

In example embodiment 2-2, based on a policy set in the SGW 30 by the control apparatus (or operator) 50, the allocation of traffic to a VNF is performed in accordance with a service level set for each user. According to example embodiment 2-2, by variably setting a policy from the control apparatus (or operator) 50, it is made possible to set variably a correspondence among a user, a service level, and a VNF. This enables effective and appropriate utilization of server resources, VM resources in particular.

In example embodiment 2-2, as in example embodiment 1-2, when the terminal 1 is an M2M terminal, a policy corresponding to a third service level in FIG. 13B may be applied, and traffic from the M2M terminal may be allocated to a low-speed VNF 1C.

Example Embodiment 2-3

Figures 14A, 14B:
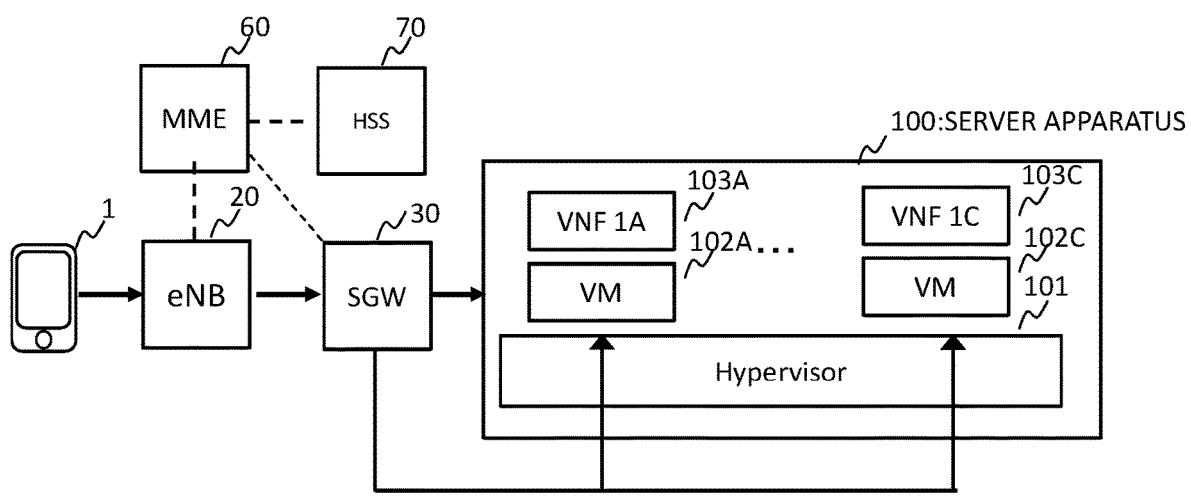
FIG. 14A and FIG. 14B are diagrams illustrating example embodiment 2-3 of the present invention.

FIGS. 14A and 14B illustrate example embodiment 2-3. Example embodiment 2-3 is a specific example of example embodiment 2. As in example embodiment 2, the allocation of traffic to a VNF is controlled on a per virtual machine (VM) basis.

As illustrated in FIG. 14A, in example embodiment 2-3, based on subscriber information (for example, change of content of a service contract (for example: change of a charging plan, addition of a prepaid fee, etc.)) in an HSS 70, the allocation of traffic to a VNF is controlled on a per user basis.

In FIG. 14A, an MME 60 performs, for example, authentication in coordination with the HSS 70, when attachment processing of the terminal 1 is performed. The MME 60 may refer to subscriber profile information (service contract information, charging information, etc.) in the HSS 70 to determine a traffic allocation destination VNF based on the subscriber profile information. The SGW 30 receives a notification (allocation destination VNF) from the MME 60 or the base station 20, sets identification information (for example, a virtual MAC address, etc.) of a virtual machine (VM) on which the allocated VNF runs, in header information of a frame or packet so that the traffic is forwarded to the virtual machine (VM), and forwards the traffic to the server apparatus 100. The server apparatus 100 forwards the traffic to the destination VNF as described with reference to FIG. 11.

In the present example embodiment, the base station 20 may determine a user-specific traffic allocation destination VNF on a per virtual machine (VM) basis.

FIG. 14B illustrates an example in which a VNF is allocated on a per user basis (per terminal identification information (terminal ID) or address of the terminal 1). Since the allocation in FIG. 14B is the same as that described with the policies in FIG. 8B (the allocation of a VNF per user), description thereof will be omitted.

In example embodiment 2-3, with a change of contract information of a user (for example, change of a charging plan or addition of a prepaid fee), the setting of the allocation of user traffic to a VNF may be changed, for example.

In example embodiment 2-3, for example, with an increase of a monthly communication capacity by addition of a prepaid fee, the setting of the allocation of user traffic to a VNF may be changed (for example, from a low-performance VNF to a high-performance VNF).

Alternatively, in example embodiment 2-3, with a change of content of a contract (upgrading, for example), the setting of the allocation of user traffic to a VNF may be changed in such a manner that the user traffic is allocated to a VNF having a further added function as compared with that of a currently selected VNF. Alternatively, with a change of content of the contract (downgrading, for example), the setting of the allocation of user traffic to a VNF may be changed in such a manner that the user traffic is allocated to a VNF having a function reduced from that of a currently selected VNF.

In addition, in example embodiment 2-3, for example, with an upgrade-change of content of a contract of a user, a voice call function and an SMS (Short Message Service) function may be released. A service chain (deployment of a VNF and physical and virtual components supporting the VNF) may be reconfigured so that the traffic of the user is enabled to use a voice call and an SMS. In contrast, with a downgrade-change of content of a service contract of a user, a VNF service chain may be reconfigured so that a function(s) that has been set cannot be used.

According to example embodiment 2-3, user traffic can be allocated to a VNF in accordance with content of a contract of a user. In addition, for example, an optimum VNF can be allocated so as to follow a change of content of the service contract.

In example embodiment 2-3, as in example embodiment 2-2, when the terminal 1 is an M2M terminal, traffic from the M2M terminal may be allocated to the low-speed VNF 1C in accordance with contract information of the M2M terminal.

Example Embodiment 2-4

Figures 15A, 15B:
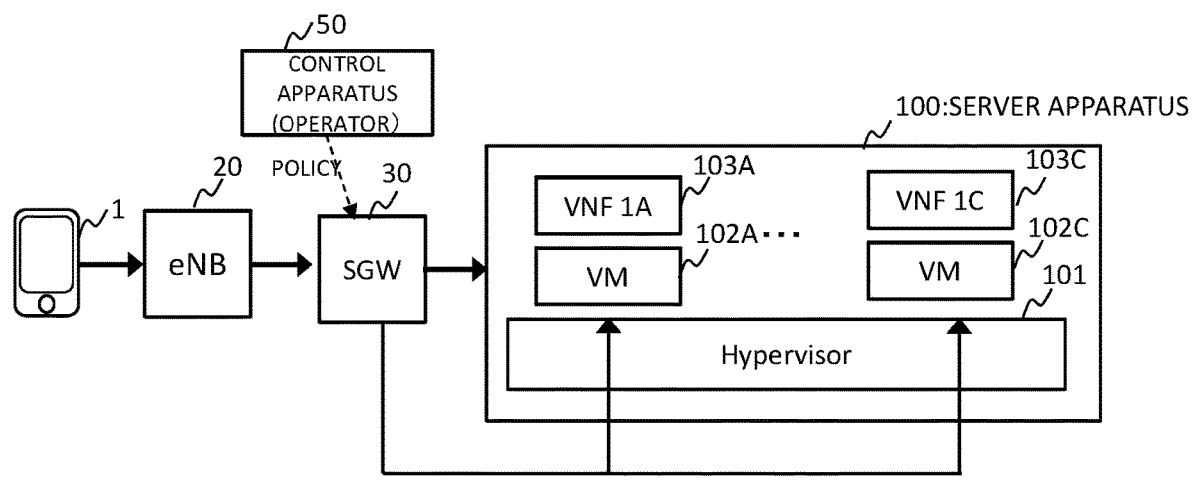
FIG. 15A and FIG. 15B are diagrams illustrating example embodiment 2-4 of the present invention.

FIGS. 15A and 15B illustrate example embodiment 2-4. Example embodiment 2-4 is a specific example of example embodiment 2. As in example embodiment 2, the allocation of traffic to a VNF is controlled on a per VM basis.

As illustrated in FIGS. 15A and 15B, in example embodiment 2-4, based on a policy from the control apparatus 50, the SGW 30 selects a traffic allocation destination VNF from a plurality of VNFs 1A to 1C arranged in the server apparatus 100, based on contents of traffic or an application. FIG. 15B lists policies as follows:

contents: YouTube (registered trademark) (HD (High Definition television)) which is high speed, a first service level, and allocation destination is VNF 1A;

contents: YouTube (registered trademark) (SD (Standard Definition television)) which is a low-speed, a third service level, and allocation destination is VNF 1C; and other video services, a second service level, and allocation destination is VNF 1B.

The SGW 30 receives a notification (allocation destination VNF) from the MME 60 or the base station 20, sets identification information (for example, a virtual MAC address, etc.) of a virtual machine (VM) on which the allocated VNF runs, in header information of a frame or packet so that the traffic is forwarded to the virtual machine (VM), and forwards the traffic to the server apparatus 100. The server apparatus 100 forwards the traffic to the destination VNF as described with reference to FIG. 11.

In example embodiment 2-4, as in the above example embodiment 1-4, content information or the like may be acquired by analyzing header (HTTP header) information in an HTTP (Hyper text Transport Protocol) request. For example, a URL (Uniform Resource Locator) of a content delivery source may be acquired from a host field (HTTP 1.1) or the like. Alternatively, a URI (Uniform Resource Identifier) indicating a unique location of contents may be acquired from Content-Location of an entity header. In addition, for example, by using Deep Packet Inspection for analyzing a payload portion of a packet or Stateful Deep Packet Inspection for checking a packet header portion, information on contents or an application may be extracted. Content information acquired may be matched with a policy to select a virtual machine (VM) realizing a traffic allocation destination VNF.

According to example embodiment 2-4, for example, it is possible to allocate a VNF corresponding to contents to be forwarded or an application providing contents.

Example Embodiment 3

Figure 16:
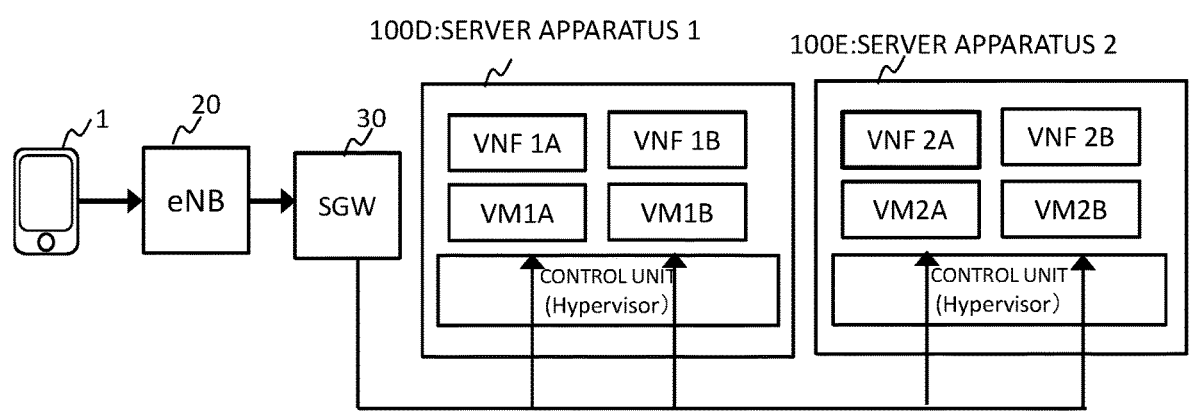
FIG. 16 is a diagram illustrating example embodiment 3 of the present invention.

FIG. 16 illustrates a configuration of example embodiment 3. In example embodiment 3, too, the allocation of traffic to a VNF is controlled on a per virtual machine (VM) basis.

In the example illustrated in FIG. 16, a service provided by VNFs (a VNF 1A and a VNF 1B) on a first server apparatus 100D and a service provided by VNFs (a VNF 2A and a VNF 2B) on a second server apparatus 100E are different to each other. Namely, while the VNF 1A and the VNF 1B are the same function (a first function), VNF 1A and the VNF 1B are different in performance classes. While the VNF 2A and the VNF 2B are the same function (a second function different from the first function), the VNF 2A and the VNF 2B are different in performance classes.

In the first server apparatus 100D on which are arranged the VNF 1A and VNF 1B providing the first service, a virtual machine VM 1A is a high-performance VM, and a virtual machine VM 1B is a low-performance VM. The VNF 1A on the virtual machine VM 1A is a high-performance VNF, and the VNF 1B on the virtual machine VM 1B is a low-performance VNF. In the second server apparatus 100E on which are arranged the VNF 2A and the VNF 2B providing the second service, a virtual machine VM 2A is a high-performance VM, and a virtual machine VM 2B is a low-performance VM. The VNF 2A on the virtual machine VM 2A is a high-performance VNF, and the VNF 2B on the virtual machine VM 2B is a low-performance VNF.

As described above, in example embodiment 3, a plurality of VNFs, whose quality levels are classified for each service, are arranged to form a chaining configuration. A granularity of the classification of the quality level or the like for each VNF may differ between the server apparatuses 100D and 100E. For example, a service level is divided into eight levels in the first server apparatus 100D, while a service level is divided into four levels in the second server apparatus 100E. Namely, the granularity of the service level may differ depending on Qos (Quality of Service), communication speed, contract and so forth.

In example embodiment 3, a hierarchy (rank) of the classification may differ depending on a VNF. For example, a high-performance VNF and a low-performance VNF may be arranged in the server apparatus 100D, while a high-performance VNF, a medium-performance VNF, and a low-performance VNF may be arranged in the server apparatus 100E.

In example embodiment 3, depending on a VNF, server apparatuses may not be divided for each service provided by the VNF and a single server apparatus may provide different services.

In addition, in example embodiment 3, VNFs classified for each service and a VNF selecting whether to add a function of the VNF (for example, SMS option) may coexist.

In addition, in example embodiment 3, as described in the above example embodiments 1-4, 2-4, etc., based on subscriber information of a user, a VNF to which traffic is allocated may be selected (a server apparatus may be selected, and a VNF in the server apparatus may be selected). Alternatively, as in the above example embodiments 1-2, 1-3, 2-2, 2-3, etc., based on a set policy, the SGW 30 may select a VNF to allocate (selection of a server apparatus, and selection of a VNF in the server apparatus selected).

Example embodiment 3 enables fine resource allocation based on a combination of services (functions) provided and a quality, and a granularity for a classification.

Example Embodiment 4

FIG. 17A illustrates a configuration of example embodiment 4. As illustrated in FIG. 17A, in example embodiment 4, a carrier-grade dedicated apparatus 120 and the server apparatuses according to example embodiment 1 described with reference to FIG. 3 (the server apparatuses 100B and 100C out of the server apparatuses 100A to 100C in FIG. 3) are provided. VNF 1B on the server apparatus 100B is obtained by virtualizing a function (network function) of the dedicated apparatus 120 on the server apparatus 100B and realizes processing and function that the dedicated apparatus 120 performs, in a software-based manner on a virtual machine. The dedicated apparatus 120 may be possessed by an MNO or a specific MVNO carrier.

As illustrated in FIG. 17B, for example, when a carrier A is a carrier (MNO or MVNO) that possesses infrastructure such as the dedicated apparatus 120 or a high-price-contract MVNO carrier, traffic corresponding to the carrier A is allocated to the dedicated apparatus 120. Traffic corresponding to a low-price-contract MVNO carrier B or C is allocated to the VNF 1B on the server apparatus 100B or the VNF 1C on the server apparatus 100C.

When allocating user traffic to the dedicated apparatus 120, the SGW 30 may set a MAC address of the dedicated apparatus 120 in a frame header of the traffic and forward the traffic. When allocating traffic to the VNF 1B, the SGW 30 selects the server apparatus 100 on which is arranged the VNF 1B (selection on a per server basis). The SGW 30 may set identification information of a virtual machine (VM) realizing the VNF 1B (or identification information of the VNF) in a frame header (packet header) or the like of the traffic and forward the traffic to the server apparatus 100B. The server apparatus 100B forwards the traffic to the destination VNF as described with reference to FIG. 11.

As a variation of example embodiment 4, the allocation destination of traffic may be controlled on a per user basis. For example, in the example illustrated in FIG. 17C, a user 1 of a carrier A corresponds to a first service level, and traffic of the user 1 is allocated to the dedicated apparatus 120. A user 2 of the carrier A corresponds to a second service level, and traffic of the user 2 is allocated to the VNF 1B.

Alternatively, in another variation of example embodiment 4, regarding traffic of users of the same carrier, according to a service level corresponding to contents that traffic (traffic destined to a terminal 1) carries, a traffic allocation destination may be set to one of the dedicated apparatus 120, the VNF 1B, and the VNF 1C. In the example illustrated in FIG. 17D, traffic carrying contents of a first service level is allocated to the dedicated apparatus 120.

The dedicated apparatus 120 may be an arbitrary network facility, a server apparatus, or the like. For example, the dedicated apparatus 120 may be a PGW or a server group in FIG. 20B or a router (Router) or the like in FIG. 19B.

According to example embodiment 4, an existing dedicated apparatus 120 (for example, an existing PGW) that does not comply with NFV can be used together with NFV. Thus, example embodiment 4 is very effective as a transitional measure (a system configuration) until network facilities are fully virtualized as NFV.

Example Embodiment 5

FIG. 18A illustrates a configuration of example embodiment 5. As illustrated in FIG. 18A, in example embodiment 5, there are provided a dedicated apparatus 120 and a server apparatus 100. The server apparatus 100 corresponds to the server apparatus 100 according to example embodiment 2 described with reference to FIG. 10 (however, the server apparatus 100 includes only the VNFs 1B and 1C). In FIG. 18A, each of the VNF 1B and the VNF 1C on the server apparatus 100 is obtained by virtualizing a function of the dedicated apparatus 120 and realizes processing and functions of the dedicated apparatus 120 on a virtual machine in a software-based manner. The dedicated apparatus 120 may be possessed by an MNO or a specific MVNO carrier. in FIG. 18A, for simplicity's sake, only one server apparatus is illustrated, but a plurality of server apparatuses may, as a matter of course, be arranged.

As illustrated in FIG. 18B, for example, when a carrier A is a carrier (an MNO or an MVNO) that possesses infrastructure such as the dedicated apparatus 120 or a high-price-contract MVNO carrier, traffic corresponding to the carrier A is allocated to the dedicated apparatus 120. Traffic corresponding to a low-price-contract MVNO carrier B or C is allocated to the VNF 1B or the VNF 1C on the server apparatus 100.

When an SGW 30 allocates traffic to the dedicated apparatus 120, for example, the SGW 30 may set a MAC address of the dedicated apparatus 120 in a frame header of the traffic to forward the traffic. When the SGW 30 allocates traffic to the VNF 1B, the SGW 30 selects the server apparatus 100 on which is arranged the VNF 1B (selection per server). The SGW 30 may set identification information of a virtual machine (VM) realizing the VNF 1B (or identification information of the VNF) in a frame header (a packet header) or the like of the corresponding traffic to forward the traffic to the server apparatus 100. The server apparatus 100 forwards the traffic to the destination VNF as described with reference to FIG. 11.

As a variation of example embodiment 5, as illustrated in FIG. 18C, traffic of a user 1 of the carrier A corresponding to a first service level may be allocated to the dedicated apparatus 120. Namely, the allocation destination of traffic is set on a per user basis.

Alternatively, as another variation of example embodiment 5, as illustrated in FIG. 18D, traffic carrying a content of the first service level may be allocated to the dedicated apparatus 120. Namely, a service level may be set on a per content that traffic (traffic destined to a terminal 1) carries, and the allocation destination of traffic may be set based on the corresponding service level.

The dedicated apparatus 120 may be an arbitrary network facility, or the like. For example, the dedicated apparatus 120 may be a PGW or a server group in FIG. 20B or a router (Router) or the like in FIG. 19B.

According to example embodiment 5, an existing dedicated apparatus 120 that does not comply with NFV can be used together with NFV. Thus, example embodiment 5 is very effective as transitional measures (system configuration) until the network facilities are fully virtualized as NFV.

The disclosure of the above NPL 1 is incorporated herein by reference thereto. Variations and adjustments of the example embodiments and examples are possible within the scope of the overall disclosure (including the claims) of the present invention and based on the basic technical concept of the present invention. Various combinations and selections of various disclosed elements (including the elements in the claims, example embodiments, drawings, etc.) are possible within the scope of the disclosure of the present invention. Namely, the present invention of course includes various variations and modifications that could be made by those skilled in the art according to the overall disclosure including the claims and the technical concept.

The above example embodiments can be described but not limited to as the following notes as examples.

(Supplementary Note 1)

A communication apparatus, comprising:

a first unit for allocating traffic to a dedicated apparatus that performs a predetermined network function or a predetermined virtual network function corresponding to the predetermined network function of the dedicated apparatus, according to a service level set in correspondence with information relating to the traffic; and a second unit for forwarding the traffic to the dedicated apparatus or the predetermined virtual network function, based on a result of the allocation.

(Supplementary Note 2)

The communication apparatus according to supplementary note 1, wherein the communication apparatus allocates the traffic, out of virtual machines which realize the predetermined virtual network function, to a first virtual machine included in a first virtual network or a second virtual machine included in a second virtual network, according to an attribute of the traffic.

(Supplementary Note 3)

The communication apparatus according to supplementary note 1 or 2, wherein the information relating to the traffic includes information on a carrier, extracted in correspondence with the traffic, a user thereof subscribing to the carrier.

(Supplementary Note 4)

The communication apparatus according to supplementary note 1 or 2, wherein the information relating to the traffic includes information on contents extracted in correspondence with the traffic that carries the contents.

(Supplementary Note 5)

The communication apparatus according to supplementary note 1 or 2, wherein the information relating to the traffic includes information on contents extracted in correspondence with the traffic that carries the contents.

(Supplementary Note 6)

The communication apparatus according to supplementary note 1 or 2, wherein the information relating to the traffic includes information on an application of a transmission source of the contents, extracted in correspondence with the traffic.

(Supplementary Note 7)

The communication apparatus according to any one of supplementary notes 1 to 6, wherein when allocating the traffic to the virtual network function according to the service level, the first unit selects a server apparatus including the virtual network function.

(Supplementary Note 8)

The communication apparatus according to any one of supplementary notes 1 to 6, wherein the first unit performs the allocation of traffic to the virtual network function according to the service level set on a per virtual machine basis, the virtual machine being implemented on a server apparatus, with the virtual network function running on the virtual machine.

(Supplementary Note 9)

The communication apparatus according to supplementary note 7, wherein when allocating the traffic to the virtual network function according to the service level, the first unit selects a server apparatus having a processing performance corresponding to the service level and including the virtual network function, out of a plurality of the server apparatuses with different processing performances, and allocates the traffic to a virtual machine that realizes the virtual network function on the selected server apparatus.

(Supplementary Note 10)

The communication apparatus according to supplementary note 7, the server apparatus includes a plurality of the virtual network functions with different processing performances, arranged on a plurality of the virtual machines, wherein, when allocating the traffic to the virtual network function according to the service level, the first unit selects one out of a plurality of the virtual network functions according to the service level, and allocates the traffic to a virtual machine that realizes the selected virtual network function.

(Supplementary Note 11)

The communication apparatus according to supplementary note 7, wherein a plurality of the server apparatuses including the virtual network functions with different functions are provided, each individual server apparatus including a plurality of the virtual network functions with the same function and different processing performances, wherein when allocating the traffic to the virtual network function according to the service level, the first unit selects a server apparatus having a relevant virtual network function out of a plurality of the server apparatuses, and selects a virtual network function according to the service level, from the plurality of virtual network functions with different processing performances, on the selected server apparatus to allocate the traffic to a virtual machine that realizes the selected virtual network function.

(Supplementary Note 12)

A communication system, including:

a server apparatus on which a virtual machine that realizes a virtual network function is implemented; and the communication apparatus according to any one of supplementary notes 1 to 11.

(Supplementary Note 13)

An allocation apparatus, including:

a first unit for allocating traffic to a dedicated apparatus that performs a predetermined network function or a predetermined virtual network function corresponding to the predetermined network function of the dedicated apparatus, according to a service level set in correspondence with information relating to the traffic; and a second unit for forwarding the traffic to the dedicated apparatus or the predetermined virtual network function, based on a result of the allocation.

(Supplementary Note 14)

The allocation apparatus according to supplementary note 13, wherein the allocation apparatus allocates the traffic, out of virtual machines which realize the predetermined virtual network function, to a first virtual machine included in a first virtual network or a second virtual machine included in a second virtual network, according to an attribute of the traffic.

(Supplementary Note 15)

The allocation apparatus according to supplementary note 13 or 14, wherein the information relating to the traffic includes information on a carrier, extracted in correspondence with the traffic, a user thereof subscribing to the carrier.

(Supplementary Note 16)

The allocation apparatus according to supplementary note 13 or 14, wherein the information relating to the traffic includes information extracted in correspondence with the traffic and being unique to the user.

(Supplementary Note 17)

The allocation apparatus according to supplementary note 13 or 14, wherein the information relating to the traffic includes information about a content which is extracted in correspondence with the traffic and which the traffic carries.

(Supplementary Note 18)

The allocation apparatus according to supplementary note 13 or 14, wherein the information relating to the traffic includes information on an application of a transmission source of the contents, extracted in correspondence with the traffic.

(Supplementary Note 19)

The allocation apparatus according to any one of supplementary notes 13 to 18, wherein when allocating the traffic to the virtual network function according to the service level, the first unit selects a server apparatus including the virtual network function.

(Supplementary Note 20)

The allocation apparatus according to any one of supplementary notes 13 to 18, wherein the first unit performs the allocation of traffic to the virtual network function according to the service level set on a per virtual machine basis, the virtual machine being implemented on a server apparatus, with the virtual network function running on the virtual machine.

(Supplementary Note 21)

The allocation apparatus according to supplementary note 19, wherein when allocating the traffic to the virtual network function according to the service level, the first unit selects a server apparatus having a processing performance corresponding to the service level and including the virtual network function, out of a plurality of the server apparatuses with different processing performances, and allocates the traffic to a virtual machine that realizes the virtual network function on the selected server apparatus.

(Supplementary Note 22)

The allocation apparatus according to supplementary note 19, wherein the server apparatus includes a plurality of the virtual network functions with different processing performances, arranged on a plurality of the virtual machines, wherein, when allocating the traffic to the virtual network function according to the service level, the first unit selects one out of a plurality of the virtual network functions according to the service level, and allocates the traffic to a selected virtual network function.

(Supplementary Note 23)

The allocation apparatus according to supplementary note 19, wherein a plurality of the server apparatuses including the virtual network functions with different functions are provided, each individual server apparatus including a plurality of the virtual network functions with the same function and different processing performances, wherein when allocating the traffic to the virtual network function according to the service level, the first unit selects a server apparatus having a relevant virtual network function out of a plurality of the server apparatuses, and selects a virtual network function according to the service level, from the plurality of virtual network functions with different processing performances, on the selected server apparatus, to allocate the traffic to a virtual machine that realizes the selected virtual network function.

(Supplementary Note 24)

A communication method comprising:

allocating traffic to a dedicated apparatus that performs a predetermined network function or a predetermined virtual network function corresponding to the predetermined network function of the dedicated apparatus, according to a service level set in correspondence with information relating to the traffic; and forwarding the traffic to the dedicated apparatus or the predetermined virtual network function, based on a result of the allocation.

(Supplementary Note 25)

The communication method according to supplementary note 24, comprising allocating the traffic, out of virtual machines which realize the predetermined virtual network function, to a first virtual machine included in a first virtual network or a second virtual machine included in a second virtual network, according to an attribute of the traffic.

(Supplementary Note 26)

The communication method according to supplementary note 24 or 25, wherein the information relating to the traffic includes information on a carrier, extracted in correspondence with the traffic, a user thereof subscribing to the carrier.

(Supplementary Note 27)

The communication method according to supplementary note 24 or 25, wherein the information relating to the traffic includes information extracted in correspondence with the traffic and being unique to the user.

(Supplementary Note 28)

The communication method according to supplementary note 24 or 25, wherein the information relating to the traffic includes information on contents extracted in correspondence with the traffic that carries the contents.

(Supplementary Note 29)

The communication method according to supplementary note 24 or 25, wherein the information relating to the traffic includes information on an application of a transmission source of the contents, extracted in correspondence with the traffic.

(Supplementary Note 30)

The communication method according to any one of supplementary notes 24 to 29, comprising when allocating the traffic to the virtual network function according to the service level, selecting a server apparatus including the virtual network function.

(Supplementary Note 31)

The communication method according to any one of supplementary notes 24 to 29, wherein the allocation of traffic to a virtual network function according to a service level is performed per virtual machine which has been implemented on a server apparatus and on which a virtual network function runs.

(Supplementary Note 32)

The communication method according to supplementary note 30, comprising selecting a server apparatus including the virtual network function corresponding to the service level, out of the plurality of server apparatuses with different processing performances to allocate the traffic to a virtual machine that realizes the virtual network function on the selected server apparatus.

(Supplementary Note 33)

The communication method according to supplementary note 30, wherein the server apparatus includes a plurality of the virtual network functions with different processing performances, arranged on a plurality of the virtual machines, the method comprising selecting one out of the plurality of virtual network functions according to the service level to allocate the traffic to the selected virtual network function.

(Supplementary Note 34)

The communication method according to supplementary note 30, wherein a plurality of the server apparatuses including the virtual network functions with different functions are provided, each individual server apparatus including a plurality of the virtual network functions with the same function and different processing performances, the method comprising:

selecting the server apparatus having a relevant virtual network function out of the plurality of server apparatuses; and selecting a virtual network function according to the service level, from the plurality of virtual network functions with different processing performances, on the selected server apparatus to allocate the traffic to the selected virtual network function.

(Supplementary Note 35)

A non-transitory computer-readable recording medium storing therein a program causing a computer to execute:

a first processing for allocating traffic to a dedicated apparatus that performs a predetermined network function or a predetermined virtual network function corresponding to the predetermined network function of the dedicated apparatus, according to a service level set in correspondence with information relating to the traffic; and a second processing for forwarding the traffic to the dedicated apparatus or the predetermined virtual network function, based on a result of the allocation.

(Supplementary Note 36)

The non-transitory computer-readable recording medium according to supplementary note 35, the medium storing a program causing the computer to perform processing comprising allocating the traffic, out of virtual machines which realize the predetermined virtual network function, to a first virtual machine included in a first virtual network or a second virtual machine included in a second virtual network, according to an attribute of the traffic.

(Supplementary Note 37)

The non-transitory computer-readable recording medium according to supplementary note 35 or 36, wherein the information relating to the traffic includes information on a carrier, extracted in correspondence with the traffic, a user thereof subscribing to the carrier.

(Supplementary Note 38)

The non-transitory computer-readable recording medium according to supplementary note 35 or 37, wherein the information relating to the traffic includes information extracted in correspondence with the traffic and being unique to the user.

(Supplementary Note 39)

The non-transitory computer-readable recording medium according to supplementary note 35 or 36, wherein the information relating to the traffic includes information on contents extracted in correspondence with the traffic that carries the contents.

(Supplementary Note 40)

The non-transitory computer-readable recording medium according to supplementary note 35 or 36, wherein the information relating to the traffic includes information on an application of a transmission source of the contents, extracted in correspondence with the traffic.

(Supplementary Note 41)

The non-transitory computer-readable recording medium according to any one of supplementary notes 35 to 40, wherein, when the traffic is allocated to the virtual network function according to the service level, the first processing select a server apparatus including the virtual network function.

(Supplementary Note 42)

The non-transitory computer-readable recording medium according to any one of supplementary notes 35 to 40, wherein, the first processing performs the allocation of traffic to a virtual network function according to a service level on a per virtual machine basis, the virtual machine, on which the virtual network function runs, being implemented on a server apparatus.

(Supplementary Note 43)

The non-transitory computer-readable recording medium according to supplementary note 42, wherein when allocating the traffic to the virtual network function according to the service level, the first processing selects a server apparatus having a processing performance corresponding to the service level and including the virtual network function, out of a plurality of the server apparatuses with different processing performances, and allocates the traffic to a virtual machine that realizes the virtual network function on the selected server apparatus.

(Supplementary Note 44)

The non-transitory computer-readable recording medium according to supplementary note 42, wherein the server apparatus includes a plurality of virtual network functions with different processing performances on a plurality of virtual machines, and wherein when allocating traffic to a virtual machine that realizes the virtual network function according to the service level, the first processing selects one of the plurality of virtual network functions according to the service level to allocate the traffic to a virtual machine that realizes the selected virtual network function.

(Supplementary Note 45)

The non-transitory computer-readable recording medium according to supplementary note 42, wherein a plurality of the server apparatuses including the virtual network functions with different functions are provided, each individual server apparatus including a plurality of the virtual network functions with the same function and different processing performances, wherein when allocating the traffic to the virtual network function according to the service level, the first processing selects a server apparatus having a relevant virtual network function out of a plurality of the server apparatuses, and selects a virtual network function according to the service level, from the plurality of virtual network functions with different processing performances, on the selected server apparatus to allocate the traffic to a virtual machine that realizes the selected virtual network function.

What is claimed is:

1. A communication apparatus comprising:
a memory configured to store instructions; and
a processor configured to execute the instructions to:
identify an operator to which traffic received belongs;
allocate the traffic to a physical node, when the identified operator is a mobile network operator;
allocate the traffic to a virtual node, according to a service level of the identified operator, when the identified operator is a mobile virtual network operator;
forward, to the physical node, the traffic allocated to the physical node; and
forward, to the virtual node, the traffic allocated to the virtual node.

2. The communication apparatus according to claim 1, wherein the processor allocates the traffic to the virtual node, according to the service level of the identified operator and a performance level of the virtual node, when the identified operator is the mobile virtual network operator.

3. The communication apparatus according to claim 1, wherein the processor identifies the operator to which the traffic received belongs according to the traffic including information on a carrier, extracted in correspondence with the traffic, a user thereof subscribing to the carrier.

4. The communication apparatus according to claim 1,
wherein the processor allocates the traffic to the virtual node, according to the service level of the identified operator and the traffic including information extracted in correspondence with the traffic and being unique to a user, when the identified operator is the mobile virtual network operator.

5. The communication apparatus according to claim 1,
wherein the processor allocates the traffic to the virtual node, according to information relating to the traffic including information on contents extracted in correspondence with the traffic that carries the contents, when the identified operator is the mobile virtual network operator.

6. The communication apparatus according to claim 1,
wherein the processor allocates the traffic to the virtual node, according to the service level of the identified operator and the traffic including information on an application of a transmission source of contents, extracted in correspondence with the traffic, when the identified operator is the mobile virtual network operator.

7. The communication apparatus according to claim 1,
wherein when allocating the traffic to the virtual node according to the service level, the processor selects a server apparatus including the virtual network function, when the identified operator is the mobile virtual network operator.

8. A communication method for a communication apparatus, comprising:
identifying an operator to which traffic received belongs;
allocating the traffic to a physical node, when the identified operator is a mobile network operator;
allocating the traffic to a virtual node, according to a service level of the identified operator, when the identified operator is a mobile virtual network operator; and
forwarding, to the physical node, the traffic allocated to the physical node; and
forwarding, to the virtual node, the traffic allocated to the virtual node.

9. The communication method according to claim 8,
further comprising
allocating the traffic to the virtual node, according to the service level of the identified operator and a performance level of the virtual node, when the identified operator is the mobile virtual network operator.

10. The communication method according to claim 8,
further comprising
identifying the operator to which the traffic received belongs, according to the traffic including information on a carrier, extracted in correspondence with the traffic, a user thereof subscribing to the carrier.

11. The communication method according to claim 8,
further comprising
allocating the traffic to the virtual node, according to the service level of the identified operator and the traffic including information extracted in correspondence with the traffic and being unique to a user, when the identified operator is the mobile virtual network operator.

12. The communication method according to claim 8,
further comprising
allocating the traffic to the virtual node according to information relating to the traffic including information on contents extracted in correspondence with the traffic that carries the contents, when the identified operator is the mobile virtual network operator.

13. The communication method according to claim 8,
further comprising
allocating the traffic to the virtual node, according to the service level of the identified operator and the traffic including information on an application of a transmission source of contents, extracted in correspondence with the traffic, when the identified operator is the mobile virtual network operator.

14. The communication method according to claim 8,
further comprising
when allocating the traffic to the virtual node according to the service level, selecting a server apparatus including the virtual network function, when the identified operator is the mobile virtual network operator.

* * * * *